United States Patent
Yaguchi et al.

(10) Patent No.: US 7,241,837 B2
(45) Date of Patent: Jul. 10, 2007

(54) VIBRATION DAMPER COMPOSITION

(75) Inventors: Shigeru Yaguchi, Osaka (JP); Katsuhiko Kimura, Hyogo (JP); Taizo Aoyama, Hyogo (JP)

(73) Assignee: Kaneka Corporation, Osaka (JP)

( * ) Notice: Subject to any disclaimer, the term of this patent is extended or adjusted under 35 U.S.C. 154(b) by 59 days.

(21) Appl. No.: 10/240,903

(22) PCT Filed: Apr. 5, 2001

(86) PCT No.: PCT/JP01/02972

§ 371 (c)(1),
(2), (4) Date: Feb. 13, 2003

(87) PCT Pub. No.: WO01/74964

PCT Pub. Date: Oct. 11, 2001

(65) Prior Publication Data

US 2003/0158336 A1    Aug. 21, 2003

(30) Foreign Application Priority Data

Apr. 5, 2000  (JP) ............... 2000-103962
Feb. 2, 2001  (JP) ............... 2001-027319

(51) Int. Cl.
*C08L 53/02* (2006.01)
(52) U.S. Cl. .................... 525/95; 525/269
(58) Field of Classification Search ........... 525/271, 525/95, 269
See application file for complete search history.

(56) References Cited

U.S. PATENT DOCUMENTS

| | | | | |
|---|---|---|---|---|
| 4,760,478 A * | 7/1988 | Pal et al. | ............ | 360/244.3 |
| 5,974,655 A * | 11/1999 | Lindman et al. | ............ | 29/594 |
| 6,576,699 B2 * | 6/2003 | Nakagawa et al. | ............ | 524/505 |
| 7,056,983 B2 * | 6/2006 | Nakagawa et al. | ............ | 525/242 |

FOREIGN PATENT DOCUMENTS

| EP | 0 479 311 A2 | 4/1992 |
|---|---|---|
| EP | 0 731 112 A2 | 9/1996 |
| EP | 0 754 743 A1 | 1/1997 |
| EP | 0 853 096 A1 | 7/1998 |
| EP | 0 866 096 A1 | 9/1998 |
| EP | 0 905 156 A1 | 3/1999 |
| JP | 5-295054 | 11/1993 |
| JP | 7-137194 | 5/1995 |
| JP | 7-138447 | 5/1995 |
| JP | 7-138811 | 5/1995 |
| JP | 8-134269 | 5/1996 |
| JP | 10-330451 | 12/1998 |
| JP | 11-323068 A | 11/1999 |
| WO | WO 93/14135 | 7/1993 |
| WO | WO 96/35458 | 11/1996 |
| WO | WO 96/35458 A | 11/1996 |

OTHER PUBLICATIONS

Koshimura et al., electronic translation of JP 05-295054, 1993.*
Koshimura et al., CAplus an 1994:166483,abstracting JP05-295054.*
Kwon et al, Macromolecules (1999), 32 (21), 6963-6968.*
Duchemin et al, Polymer Preprints, 1999, 40 (2), 1034.*
Supplementary Partial European Search Report Under Rule 46, Paragraph 1 of the European Patent Convention, Corresponding to Application No. EP 01 91 7840, Dated Jun. 2, 2003, 6 Pages.
Supplementary European Search Report, Corresponding to Application No. EP 01 91 7840, Dated Jun. 15, 2004, 8 Pages.

* cited by examiner

*Primary Examiner*—Jeffrey Mullis
(74) *Attorney, Agent, or Firm*—Brinks Hofer Gilson & Lione

(57) ABSTRACT

The present invention has for its object to provide a damping material which, despite a high damping capacity at and around room temperature, has a small temperature dependence of rigidity at and around room temperature and a damping material having hot-melt processability and a good balance between damping capacity and temperature dependence of rigidity at and around room temperature.

This invention provides a damper material composition wherein the ratio of the storage modulus (G') value at 0° C. to the corresponding value at 40° C. as found by the measurement of dynamic viscoelasticity in the shear mode, namely ($G'_{0° C.}/G'_{40° C.}$), is not greater than 15 and the loss tangent (tan δ) value as found by said measurement is not smaller than 0.4 at 0° C. to 40° C.

19 Claims, 3 Drawing Sheets

VIBRATION DAMPER COMPOSITION

RELATED APPLICATIONS

This application is a nationalization of PCT application PCT/JP01/02972 filed Apr. 5, 2001. This application claims priority from the PCT application and Japan Application Serial No. 2000-103962 filed Apr. 5, 2000 and Japan Application Serial No. 2001-027319 filed Feb. 2, 2001.

TECHNICAL FIELD

The present invention relates to a damper material composition for use as a damper (viscoelastic damper) which absorbs the impact displacement and vibrations of framework structural members in the field of architecture and to a damper and a vibtration-damping double-sided adhesive tape, in which the composition is employed.

BACKGROUND ART

In the field of architecture, we are witnessing the development of vibration dampers for absorbing the vibrations caused by earthquakes, typhoons, etc. to thereby incorporate a very efficient damping mechanism in buildings. Damping materials for vibration dampers are required to be high in damping capacity in order that the impact displacement and vibrations of the framework structural members of buildings may be absorbed and, at the same time, small in the temperature dependence of rigidity at and around room temperature in consideration of environmental conditions.

While materials of high molecular weight generally show high damping capacities in the neighborhood of glass transition temperature (Tg), this Tg region is the temperature region where such a high molecular material undergoes a transition from a highly rigid glass-like state to a sparingly rigid rubbery state and is also a region of high temperature dependence of rigidity. Therefore, it is usual that damping materials for general use are used at and around the glass transition temperature so as to let them express high damping capacities [Vibration Damping Technology, The Japan Society of Mechanical Engineers (ed.) Yokendo, p. 75].

In the architectural field, where changes in atmospheric temperature from summer months to winter months and vice versa and regional differences in atmospheric temperature, it is essential to avoid using damping materials having a large temperature dependence of rigidity. However, high damping capacities can hardly be expected at temperatures outside the glass transition temperature region, where the temperature dependence of rigidity is small. Thus, a small temperature dependence of rigidity and a large damping capacity are conflicting characteristics in polymer materials and usually it is extremely difficult to reconcile these two parameters.

Ordinary rubber materials have a certain degree of damping capacity at and around room temperature but if an attempt is made to increase the damping capacity, the rigidity will be sacrificed, with the result that, as a practical problem, the down-sizing of dampers are difficult. Moreover, these materials are hardly capable of providing a high damping capacity enough to use for dampers.

As damping rubbers exhibiting high damping capacities at and around room temperature, oil-modified norbornene rubbers and high-vinyl styrene-isoprene block copolymers and their hydrogenated versions (HYBLAR™), among others, are commercially available. These damping rubbers generally have glass transition points (Tg) at and around room temperature. Such materials have high damping capacities at and around room temperature but show large changes in elastic modulus around Tg so that the temperature dependence of rigidity at and around room temperature is very large, making them hardly applicable to dampers.

As damping materials for viscoelastic dampers in the architectural field, polyurethane compounds and polyurethane/asphalt compositions are known (Japanese Kokai Publication Hei-10-330451). However, all such materials remain to be further improved in regard of the balance between damping capacity and temperature-dependence of rigidity at and around room temperature. Particularly because the Tg of such a composition is designed to be not over 0° C. in order to minimize the temperature dependence of rigidity at and around room temperature, the damping capacity in the temperature region of about 20 to 40° C. is unduly low.

On the other hand, it is disclosed in WO 93/14135 and Japanese Kokai Publication Hei-7-137194 that damping materials may be obtained from styrene-isobutylene block copolymers but all that is disclosed there is that only general-purpose damping materials may be obtained and neither disclosure includes teachings on applications demanding special characteristics such as those required of viscoelastic dampers for use in the field of architecture. Moreover, in the materials specifically described as examples in the above publications, the glass transition temperature is invariably below −15° C. so that the temperature dependence of rigidity is small at and around room temperature. However, the damping capacities of these materials at and around room temperature are too low for them to use as damping materials.

In addition, the damper material composition for vibration dampers materials must have a rigidity of the order retaining its shape and a deformability capable of with standing large seismic vibrations due to an earthquake.

The technology of fabricating vibration dampers from such damping materials includes the method comprising laminating a damper sheet with steel plates using an adhesive and the hot-melt method comprising melt-molding the damping material. The laminating method using an adhesive is suitable for the processing of damping materials in the sheet form but does not easily lend itself to the fabrication of other shapes. Therefore, the damper material composition for vibration dampers preferably has self-adhesive properties. On the other hand, the hot-melt method comprises merely pouring a molten viscoelastic material into molds so that the material can be easily processed into a variety of shaped products, with the additional advantage that the processing cost is low. From these points of view, the damping materials for vibration dampers preferably have hot-melt properties.

SUMMARY OF THE INVENTION

The present invention, developed in the above state of the art, has for its object to provide not only a damping material which, despite a high damping capacity at and around room temperature, has a small temperature dependence of rigidity at and around room temperature, as well as self-adhesive properties and good deformability, but also a damper and a double-sided self-adhesive tape having a vibration damping function, both of which are comprised of said damping material.

It is a further object of the invention to provide not only a damping material having hot-melt processability and a good balance between damping capacity and temperature dependence of rigidity at and around room temperature but also a damper and a double-sided self-adhesive tape having a vibration damping function, both of which are comprised of said damping material.

The first aspect of the present invention, therefore, is concerned with a damper material composition wherein the ratio of the storage modulus (G') value at 0° C. to the corresponding value at 40° C. as found by the measurement of dynamic viscoelasticity in the shear mode, namely ($G'_{0°\ C.}/G'_{40°\ C.}$), is not greater than 15 and the loss tangent (tan δ) value as found by said measurement is not smaller than 0.4 at 0° C. to 40° C.

The first aspect of the present invention is specifically concerned with a damper material composition which comprises a block copolymer (A) comprising a polymer block (a) and a polymer block (b) and terminating in said polymer block (b), said polymer block (a) being comprised of an aromatic vinyl compound as a constituent monomer, and said polymer block (b) being comprised of isobutylene as a constituent monomer.

The second aspect of the present invention is concerned with a damper material composition comprising a diblock copolymer (A') comprising a polymer block (a') and a polymer block (b), said polymer block (a') being comprised of an aromatic vinyl compound as a constituent monomer and having a number average molecular weight of not more than 10,000, and said polymer block (b) being comprised of isobutylene as a constituent monomer.

The third aspect of the present invention is concerned with a vibration damper having structure of a combination of said damper material composition with steel sheet or pipe.

The fourth aspect of the present invention is concerned with a damping double-sided self-adhesive tape comprising said damper material composition as molded in the form of a tape.

Hereinafter, the invention is described in detail.

DISCLOSURE OF THE INVENTION

The damper material composition according to the first aspect of the present invention is preferably a composition such that the ratio of the storage modulus (G') value at 0° C. to the corresponding value at 40° C. as found by a dynamic viscoelasticity measurement in the shear mode, namely ($G'_{0°\ C.}/G'_{40°\ C.}$), is not more than 15 and that the loss tangent (tan δ) value found by said measurement is not less than 0.4 at 0° C. to 40° C.

The dynamic viscoelasticity in the shear mode can be measured in accordance with JIS K-6394 (Testing methods for dynamic properties of vulcanized rubber and thermoplastic rubber). The frequency to be used should be 0.1 to 5 Hz. This range corresponds to the frequency of vibrations of buildings in an earthquake or a typhoon. The storage modulus (G') and loss tangent (tan δ) values found by such a dynamic viscoelasticity measurement in the shear mode correspond to the equivalent rigidity (Keq) and equivalent damping factor (heq) parameters used in the field of architecture and the following relation is known to hold: G'=Keq, tan δ=2·heq. In the above relation, G' represents the rigidity of a damping material. The larger the value of G' is, the higher is the rigidity. On the other hand, tan δ represents the damping capacity of a damping material, and the larger the value is, the greater is the damping capacity. As mentioned above, when a damping material is to be used as a viscoelastic damper, it must have a large damping capacity and a small temperature dependence of rigidity at and around room temperature.

The measurement of dynamic viscoelasticity in the shear mode is performed using a specimen with an S/D value (unit: mm) [where S stands for shear area (unit: mm$^2$) and D stands for thickness (unit: mm)] of not less than 20. For example, when 2 specimens each measuring 5 mm×6 mm×2 mm (thickness) are used, the S/D value is 30 mm. When the S/D value is less than 20, the influence of deformation other than pure shear deformation tends to appear.

In the damper material composition according to the first aspect of the invention, the ratio of the G' value at 0° C. ($G'_{0°\ C.}$) to the corresponding value at 40° C. ($G'_{40°\ C.}$), namely ($G'_{0°\ C.}/G'_{40°\ C.}$), is preferably not more than 15, more preferably not more than 12, and still more preferably not more than 10. Furthermore, in the damper material composition according to the first aspect of the invention, the tan δ value at 0° C. to 40° C. is preferably not less than 0.4, more preferably not less than 0.5, still more preferably not less than 0.7.

The damper material composition according to the first aspect of the invention preferably comprises a block copolymer (A) comprising a polymer block (a) comprised of an aromatic vinyl compound as a constituent monomer and a polymer block (b) comprised of isobutylene as a constituent monomer and terminating in said polymer block (b). The polymer block (A) is preferably a diblock copolymer of the polymer block (a)—polymer block (b) structure because of a balance between damping capacity and temperature dependence of rigidity at and around room temperature.

The inventors of the present invention discovered that a polymer block (b)—terminated block copolymer (A) shows a peculiar glass transition behavior and arrived at the present invention.

A block copolymer not terminating in a polymer block (b), for example a triblock copolymer of the (a)-(b)-(a) structure has a glass transition point corresponding to the polymer block (a) and a glass transition point corresponding to the polymer block (b). This kind of behavior is observed generally in block copolymers each comprising a combination of polymer blocks having a tendency toward phase separation and is a phenomenon well known to those skilled in the art.

However, the inventors found after an intensive investigation that a block copolymer (A) terminating in the polymer block (b) has a third glass transition point intermediate between the glass transition point corresponding to the polymer block (a) and the glass transition point corresponding to the polymer block (b). Therefore, the block copolymer (A) terminating in the polymer block (b) shows a peak tan δ value corresponding to said third glass transition point in the rubber region above the glass transition point of the polymer block (b). As a consequence, despite the fact that in the usual rubber region, the temperature dependence of rigidity (G') is small but the damping performance (tan δ) is also low, the damper material composition of the invention shows a high damping capacity in this region where the temperature dependence of rigidity is small.

The block copolymer (A) which can be used in the first aspect of the invention is not particularly restricted as far as it is a block copolymer comprising polymer block (a) and polymer block (b) and terminating in the polymer block (b) and can be any of block, diblock, triblock and multi-block copolymers having a linear, branched, stellar or other structure. Thus, the block copolymer (A) satisfying the desired viscoelastic characteristics, physical properties such as maximum strain coefficient and shear strength, and processability can be selected. By using a block copolymer comprising said polymer block (b) comprised of isobutylene as a constituent monomer in at least one terminal position and at least one said polymer block (a) comprised of an aromatic vinyl compound as a constituent monomer, the damping capacity in the temperature region of 20 to 40° C. can be augmented without increasing the temperature dependence of rigidity at and around room temperature. The reason is that when the polymer block (b) comprised of isobutylene as a constituent monomer exists at the molecular terminus, said polymer block (b) is increased in motility to form a highly intermingled phase with the polymer block (a) comprised of an aromatic vinyl compound as a constituent monomer, with the result that an intermediate Tg appears de novo between the Tg of the polymer block (b) comprised of isobutylene as a constituent monomer and the Tg of the polymer block (a) comprised of an aromatic vinyl compound as a constituent monomer.

While the polymer block (a) is a polymer block comprised of an aromatic vinyl compound as a constituent monomer, the aromatic vinyl compound is not particularly restricted as far as it has an aromatic ring and a carbon-carbon double bond conducive to cationic polymerization. As specific examples, there can be mentioned styrene, o-, m- or p-methylstyrene, α-methylstyrene, β-methylstyrene, 2,6-dimethylstyrene, 2,4-dimethylstyrene, α-methyl-o-methylstyrene, α-methyl-m-methylstyrene, α-methyl-p-methylstyrene, β-methyl-o-methylstyrene, β-methyl-m-methylstyrene, β-methyl-p-methylstyrene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, o-, m- or p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, o-, m- or p-t-butylstyrene, o-, m- or p-methoxystyrene, o-, m- or p-chloromethylstyrene, o-, m- or p-bromomethylstyrene, silyl-substituted styrene derivatives, indene, vinylnaphthalene, and so on. These may be used singly or in a combination of two or more species. The preferred, among them, is at least one selected from the group consisting of styrene, p-methylstyrene, α-methylstyrene, p-chlorostyrene, p-t-butylstyrene, p-methoxystyrene, p-chloromethylstyrene, p-bromomethylstyrene, silyl-substituted styrene derivatives and indene. The more preferred is at least one selected from the group consisting of styrene, α-methylstyrene, p-methylstyrene and indene. From cost points of view, styrene, α-methylstyrene or a mixture thereof is particularly preferred.

The polymer block (a) may additionally contain a monomer or monomers other than said aromatic vinyl compound. When it contains any monomer other than the aromatic vinyl compound, the aromatic vinyl compound preferably accounts for not less than 60 weight %, more preferably not less than 80 weight %, of the total weight of the polymer block (a). The monomer or monomers other than the aromatic vinyl compound in the polymer block (a) is not particularly restricted inasmuch as they are monomers capable of undergoing cationic polymerization with the aromatic vinyl compound, thus including such monomers as isobutylene, aliphatic olefins, dienes, vinyl ethers, β-pinene and so on. These may be used singly or in a combination of two or more species.

The polymer block (a) preferably has a number average molecular weight of not more than 10,000 as will be described later herein.

The polymer block (b) as a component of the block copolymer (A) according to the first aspect of the invention is a polymer block comprised of isobutylene as a constituent monomer.

While the polymer block (b) is comprised of isobutylene, it may optionally contain a monomer or monomers other than isobutylene. When it additionally contains such a monomer or monomers other than isobutylene, the proportion of isobutylene in the polymer block (b) is preferably not less than 60 weight %, more preferably not less than 80 weight %. The monomer other than isobutylene in the polymer block (b), that can be used, is not particularly restricted as far as it is capable of undergoing cationic polymerization with isobutylene, thus including said aromatic vinyl compounds, aliphatic olefins, dienes, vinyl ethers and β-pinene, among other monomers. These may be used singly or in a combination of two or more species.

In the context of the invention, the aliphatic olefin includes ethylene, propylene, 1-butene, 2-methyl-1-butene, 3-methyl-1-butene, pentene, hexene, cyclohexene, 4-methyl-1-pentene, vinylcyclohexane, octene and norbornene. These may be used singly or in a combination of two or more species. The preferred, among them, are 1-butene, 2-methyl-1-butene, 3-methyl-1-butene, pentene, hexene, cyclohexene, 4-methyl-1-pentene, vinylcyclohexane, octene and norbornene.

In the context of the invention, the diene includes butadiene, isoprene, hexadiene, cyclopentadiene, cyclohexadiene, dicyclopentadiene, divinylbenzene and ethylidenenorbornene. These may be used singly or in a combination of two or more species.

Also in the context of the invention, the vinyl ether includes methyl vinyl ether, ethyl vinyl ether, (n-, iso)propyl vinyl ether, (n-, sec, tert-, iso-)butyl vinyl ether, methyl propenyl ether and ethyl propenyl ether. These may be used singly or in a combination of two or more species.

In the block copolymer (A), the relative proportions of the polymer block (a) comprised of an aromatic vinyl compound as a constituent monomer and the polymer block (b) comprised of isobutylene as a constituent monomer are not particularly restricted but, in terms of the balance between physical state and processability, the polymer block (a)/polymer block (b) ratio is preferably 2/98 to 60/40 by weight, more preferably 5/95 to 40/60 by weight.

The number average molecular weight of the block copolymer (A) is not particularly restricted, either, but in terms of the balance between physical state and processability, it is preferably within the range of 3,000 to 1,000,000, more preferably 5,000 to 500,000. When the number average molecular weight of the block copolymer (A) is below the above-defined range, the intrinsic physical properties of the composition are not fully expressed. On the other hand, exceeding the above range results in poor processability.

The preferred structure of block copolymer (A), in terms of the physical state and processability of the composition, is at least one selected from the group consisting of a diblock copolymer of the polymer block (a)—polymer block (b) structure, a triblock copolymer of the polymer block (b)—polymer block (a)—polymer block (b) structure, and a stellate copolymer comprising a core of said polymer block (a) and arms of said polymer block (b).

From the standpoint of the ease of production, a diblock copolymer of the polymer block (a)—polymer block (b) structure is particularly preferred.

For the purpose of improving the adhesion of the damper material composition of the invention to steel sheets or pipes, for instance, copolymers having various functional groups terminally or intermediately of the molecular chain can also be employed as the block copolymer (A). As such functional groups, there may be mentioned epoxy, hydroxyl, amino, alkylamino, alkoxy and other ether groups, carboxyl, alkoxycarbonyl, acyloxy and other ester groups, carbamoyl, alkylcarbamoyl, acylamino and other amido groups, maleic anhydride and other acid anhydride groups, silyl, allyl, vinyl and other groups. The block copolymer (A) may have only one of these functional groups or two or more of them. The functional groups which are preferred in terms of the balance of physical properties, for instance, are epoxy, amino, ether, ester, amido, silyl, allyl and vinyl groups.

The method of producing the block copolymer (A) is not particularly restricted but includes various known polymerization techniques. However, in order that a block copolymer of controlled structure may be produced, it is preferred to copolymerize a monomer component comprising isobutylene as a predominant monomer and a monomer component comprising an aromatic vinyl compound as a predominant monomer in the presence of a compound represented by the following general formula (I).

$$(CR^1R^2X)_nR^3 \quad (I)$$

wherein X represents a substituent group selected from the group consisting of a halogen atom, an alkoxy group containing 1 to 6 carbon atoms and an acyloxy group containing 1 to 6 carbon atoms. $R^1$ and $R^2$ each represents a hydrogen atom or a univalent hydrocarbon group containing 1 to 6 carbon atoms. $R^1$ and $R^2$ may be the same or different. Moreover, $R^1$ and $R^2$, when plural, may respectively be the same group or different groups. $R^3$ represents an n-valent aromatic hydrocarbon group or an n-valent aliphatic hydrocarbon group. n represents a natural number of 1 to 6.

The halogen atom mentioned above includes chlorine, fluorine, bromine and iodine. The alkoxy group containing 1 to 6 carbon atoms is not particularly restricted but may for example be methoxy, ethoxy or n- or isopropoxy. The acyloxy group containing 1 to 6 carbon atoms is not particularly restricted but may for example be acetyloxy or propionyloxy. The hydrocarbon group containing 1 to 6 carbon atoms is not particularly restricted but may for example be methyl, ethyl, or n- or isopropyl.

To synthesize a diblock copolymer of the polymer block (a)—polymer block (b) structure, a compound of the above general formula (I) wherein n=1 can be used. To synthesize a triblock copolymer of the polymer block (b)—polymer block (a)—polymer block (b) structure, a compound of the above general formula (I) wherein n=2 can be used. Further, to synthesize a stellate polymer having a core of polymer block (a) and arms of polymer block (b), a compound of the above general formula (I) wherein n=3 to 6 can be used.

The compound represented by the above general formula (I) acts as an initiator, being suspected to form a carbocation in the presence of a Lewis acid or the like to provide an initiation site for cationic polymerization. As examples of the compound of general formula (I) which can be used in the present invention, the following compounds, among others, can be mentioned.

(1-Chloro-1-methylethyl)benzene: $C_6H_5C(CH_3)_2Cl$,
2-Methoxy-2-phenylpropane: $C_6H_5C(CH_3)_2OCH_3$,
2-Chloro-2,4,4-trimethylpropane: $(CH_3)_3CCH_2C(CH_3)_2Cl$,
1,4-Bis(1-chloro-1-methylethyl)benzene:
1,4-$Cl(CH_3)_2CC_6H_4C(CH_3)_2Cl$,
1,3-Bis(1-chloro-1-methylethyl)benzene:
1,3-$Cl(CH_3)_2CC_6H_4C(CH_3)_2Cl$,
1,3,5-Tris(1-chloro-1-methylethyl)benzene:
1,3,5-$(ClC(CH_3)_2)_3C_6H_3$,
1,3-Bis(1-chloro-1-methylethyl)-5-(tert-butyl)benzene:
1,3-$(C(CH_3)_2Cl)_2$-5-$(C(CH_3)_3)C_6H_3$.

Particularly preferred, among these, are (1-chloro-1-methylethyl)benzene: $C_6H_5C(CH_3)_2Cl$, bis(1-chloro-1-methylethyl)benzene: $Cl(CH_3)_2CC_6H_4C(CH_3)_2Cl$ and tris(1-chloro-1-methylethyl)benzene: $(ClC(CH_3)_2)_3C_6H_3$.

Incidentally, (1-chloro-1-methylethyl)benzene is also known as α-chloroisopropylbenzene, 2-chloro-2-propylbenzene or cumyl chloride; bis(1-chloro-1-methylethyl)benzene is also known as bis(α-chloroisopropyl)benzene, bis(2-chloro-2-propyl)benzene or dicumyl chloride; and tris(1-chloro-1-methylethyl)benzene is also known as tris(α-chloroisopropyl)benzene, tris(2-chloro-2-propyl)benzene or tricumyl chloride.

The above polymerization reaction can be conducted in the presence of a Lewis catalyst. The Lewis catalyst need only be a compound that can be used for cationic polymerization, thus including metal halides, such as $TiCl_4$, $TiBr_4$, $BCl_3$, $BF_3$, $BF_3 \cdot OEt_2$, $SnCl_4$, $SbCl_5$, $SbF_5$, $WCl_6$, $TaCl_5$, $VCl_5$, $FeCl_3$, $ZnBr_2$, $AlCl_3$, $AlBr_3$, etc., and organometal halides such as $Et_2AlCl$, $EtAlCl_2$, etc., to mention but a few preferred examples. In consideration of catalytic activity and commercial availability, $TiCl_4$, $BCl_3$ and $SnCl_4$ are preferred.

The amount of use of the Lewis catalyst is not particularly restricted but can be selected in consideration of the polymerizing properties and concentration of the monomers used, among other variables.

In conducting the above polymerization reaction, an electron donor component may be caused to be present concomitantly as necessary. The electron donor component is considered to be effective in stabilizing the polymer growth-associated carbocation in cationic polymerization, and by adding such an electron donor, there can be obtained a polymer having a controlled narrow molecular weight distribution. The electron donor component is not particularly restricted but includes pyridines, amines, amides, sulfoxides, esters, and metal compounds having an oxygen atom bound to the metal atom, among others.

Where necessary, the above polymerization reaction may be carried out in an organic solvent. The organic solvent is not particularly restricted as far as it does not substantially inhibit the cationic polymerization. As examples, there can be mentioned halogenated hydrocarbons such as methyl chloride, dichloromethane, chloroform, ethyl chloride, dichloroethane, n-propyl chloride, n-butyl chloride and chlorobenzene; benzene, toluene, xylene, and alkylbenzenes such as ethylbenzene, propylbenzene and butylbenzene; straight-chain aliphatic hydrocarbons such as ethane, propane, butane, pentane, hexane, heptane, octane, nonane and decane; branched-chain aliphatic hydrocarbons such as 2-methylpropane, 2-methylbutane, 2,3,3-trimethylpentane and 2,2,5-trimethylhexane; cyclic aliphatic hydrocarbons such as cyclohexane, methylcyclohexane and ethylcyclohexane; paraffin oil prepared by hydrogenation and purification of a petroleum distillate.

These solvents can be used singly or in a combination of two or more species taking into consideration the polymerization characteristics of the constituent monomers of the block copolymer (A) and the solubility of the product polymer, among other factors.

The amount of use of said solvent is selected so as to give a polymer concentration of 1 to 50 wt. %, preferably 3 to 35 wt. %, in consideration of the viscosity of the resulting polymer solution and the ease of heat removal.

In conducting the polymerization reaction on a commercial scale, the respective components are admixed under cooling, for example at a temperature not below $-100°$ C. but below $0°$ C. To strike a balance between the cost of energy and the stability of polymerization, the preferred temperature range is $-80°$ C. to $-30°$ C.

The above polymerization reaction can be conducted batchwise (batch or semi-batch method) or on a continuous mode in which each component necessary for polymerization is continuously fed to a reactor.

The method of producing a stellate polymer having said polymer block (a) as the core and said polymer block (b) as the arm component is not particularly restricted but includes the method which comprises copolymerizing a monomer component predominantly composed of an aromatic vinyl compound with a monomer component predominantly composed of isobutylene in the presence of a compound having 3 or more cationic polymerization initiation sites and the method which comprises copolymerizing a monomer component predominantly composed of isobutylene with a monomer component predominantly composed of an aromatic vinyl compound to prepare a diblock copolymer and, then, coupling (jointing) said diblock copolymer with a polyfunctional compound as a coupling (jointing) agent.

As the polyfunctional compound mentioned just above, a compound having 3 or more reaction sites (functional groups) for coupling can be used. Also usable is a compound having 2 reaction sites per mole and capable of polymerizing or reacting to form a polymer have 3 or more reaction sites (functional groups).

The polyfunctional compound mentioned above includes divinyl aromatic compounds such as 1,3-divinylbenzene, 1,4-divinylbenzene, 1,2-diisopropenylbenzene, 1,3-diisopropenylbenzene, 1,4-diisopropenylbenzene, 1,3-divinylnaphthalene, 1,8-divinylnaphthalene, 2,4-divinylbiphenyl, 1,2-divinyl-3,4-dimethylbenzene, 1,3-divinyl-4,5,8-tributylnaphthalene, 2,2'-divinyl-4-ethyl-4'-propylbiphenyl, etc.; trivinyl aromatic compounds such as 1,2,4-trivinylbenzene, 1,3,5-trivinylnaphthalene, 3,5,4'-trivinylbiphenyl, 1,5,6-trivinyl-3,7-diethylnaphthalene, etc.; diepoxides such as cyclohexane diepoxide, 1,4-pentane diepoxide, 1,5-hexane diepoxide, etc.; diketones such as 2,4-hexanedione, 2,5-hexanedione, 2,6-heptanedione, etc.; dialdehydes such as 1,4-butanedial, 1,5-pentanedial, 1,6-hexanedial, etc.; siloxane compounds and calixarenes. These may be used singly or in a combination of 2 or more species.

Among these, from the standpoint of reactivity, physical properties of the product stellate polymer, etc., divinyl aromatic compounds can be used with advantage, and it is particularly preferable to use at least one species selected from the group consisting of 1,3-divinylbenzene, 1,4-divinylbenzene, 1,3-diisopropenylbenzene and 1,4-diisopropenylbenzene. These compounds are generally available commercially as mixtures with, for example, ethylvinylbenzene and the like and as far as such mixtures are predominantly composed of said divinyl aromatic compound or compounds, they can be used as they are or, if desired, may be purified to higher purity and put to use.

The block copolymer (A) content of the damper material composition according to the first aspect of the present invention should vary with the other components used in combination and cannot be specified in general terms but is preferably not less than 20 weight %, more preferably not less than 30 weight %. Below this formulating amount, the balance between damping capacity and temperature dependence of rigidity at and around room temperature tends to be adversely affected.

The damper material composition according to the first aspect of the present invention may contain any other optional components in addition to said block copolymer (A) comprising a polymer block (a) comprised of an aromatic vinyl compound as a constituent monomer and a polymer block (b) comprised of isobutylene as a constituent monomer and terminating in said polymer block (b). As such other optional components, there can be mentioned thermoplastic polymers such as a thermoplastic resin (C) and a thermoplastic elastomer (D), a tackifying resin, a plasticizer and a filler, among others.

The thermoplastic resin (C) is added for the purpose of improving the rigidity and deformability of the damper material composition.

The thermoplastic resin (C) includes ethylene-propylene copolymer, ethylene-butene copolymer, ethylene-hexene copolymer, ethylene-octene copolymer, ethylene-vinyl acetate copolymer, ethylene-ethyl acrylate copolymer, high-density polyethylene, low-density polyethylene, linear low-density polyethylene, polypropylene, natural rubber, diene polymer rubber, olefin polymer rubber, acrylic rubber and urethane rubber, among others. The diene polymer rubber includes isoprene rubber, butadiene rubber, 1,2-polybutadiene, styrene-butadiene rubber, chloroprene rubber, nitrile rubber and so on. The olefin polymer rubber includes isobutylene-isoprene copolymer (commonly known as butyl rubber), halogenated butyl rubber, ethylene-propylene-diene rubber and so on.

The preferred, among these, in consideration of the good compatibility with the block copolymer (A), small influence on temperature dependency of rigidity, damping capacity and other dynamic characteristics, and ease of control of rigidity and deformability, are ethylenic copolymers such as ethylene-propylene copolymer, ethylene-butene copolymer, ethylene-hexene copolymer, ethylene-octene copolymer, ethylene-vinyl acetate copolymer, ethylene-ethyl acrylate copolymer, high-density polyethylene, low-density polyethylene, linear low-density polyethylene, etc. and isobutylene-isoprene copolymer (butyl rubber).

When the thermoplastic resin (C) is formulated, the amount of its use is not particularly restricted but may usually be 1 to 1000 weight parts relative to 100 weight parts of the block copolymer (A). From composition performance points of view, the range of 1 to 100 weight parts is preferred.

The thermoplastic elastomer (D) (in the context of the invention, the thermoplastic elastomer does not include the block copolymer (A)) is used for improving the cohesive force of the damper material composition and improving the rigidity and deformability. The thermoplastic elastomer (D) includes styrenic thermoplastic elastomers, olefinic thermoplastic elastomers, vinyl chloride thermoplastic elastomers, urethane thermoplastic elastomers, polyester thermoplastic elastomers and polyamide thermoplastic elastomers, among others. Preferred, among these, from the standpoint of compatibility with the block copolymer (A) are styrenic thermoplastic elastomers.

Particularly preferred, among such styrenic thermoplastic elastomers, in terms of industrial availability is a triblock copolymer comprising (a polymer block comprised of an aromatic vinyl compound as a constituent monomer)—(a polymer block comprised of a conjugated diene as a constituent monomer and optionally hydrogenated)—(a polymer block comprised of an aromatic vinyl compound as a constituent monomer) and a triblock copolymer comprising (a polymer block comprised of an aromatic vinyl compound as a constituent monomer)—(a polymer block comprised of isobutylene as a constituent monomer)—(a polymer block comprised of an aromatic vinyl compound as a constituent monomer). In this connection, the polymer block comprised of a conjugated diene as a constituent monomer and optionally hydrogenated includes conjugated diene polymer blocks (e.g. polybutadiene block, polyisoprene block, etc.), partially hydrogenated conjugated diene polymer blocks, and completely hydrogenated conjugated diene polymer blocks (e.g. ethylene-butylene copolymer block, ethylene-propylene copolymer block, etc.), among others.

As the aromatic vinyl compound mentioned above, it is preferable to use at least one monomer selected from the group consisting of styrene, α-methylstyrene, p-methylstyrene and indene, and from the standpoint of cost, styrene, α-methylstyrene or a mixture thereof is particularly preferred. The conjugated diene mentioned above includes butadiene and isoprene, among others. These may be used singly or in a combination of two species.

When the thermoplastic elastomer (D) is formulated, the amount of its use is not particularly restricted but may generally be 1 to 1000 weight parts relative to 100 weight parts of the block copolymer (A), with the range of 1 to 100 weight parts being preferred from the standpoint of performance of the composition.

The tackifying resin is a low-molecular-weight resin having a number average molecular weight of 300 to 3,000 and a softening point of 60 to 150° C. as measured by the ring-and-ball method defined in JIS K-2207, thus including rosins, rosin derivatives, polyterpene resins, aromatic-modified terpene resins and hydrogenation products thereof, terpene-phenol resins, chroman-indene resins, aliphatic petroleum resins, alicyclic petroleum resins and hydrogenation products thereof, aromatic petroleum resin and hydrogenation products thereof, aroma-to-aliphatic copolymer petroleum resins, dicyclopentadiene petroleum resins and hydrogenation products thereof, styrene and substituted styrene, among other low-molecular-weight polymers.

The tackifying resin mentioned above is effective in shifting the Tg of the polymer block (b) comprised of isobutylene as a constituent monomer toward the higher end of the temperature scale. To attain this shift, it is recommendable to formulate a tackifying resin which is compatible with the polymer block comprised of isobutylene as a constituent monomer and constituting the block copolymer (A). As tackifying resins of this kind, there can be used alicyclic petroleum resins and hydrogenation products thereof, aliphatic petroleum resins, hydrogenated aromatic petroleum resins and polyterpene resins, to mention but a few preferred examples.

Among tackifying resins within the same category, one having a higher softening point is more effective in shifting the Tg of the polymer block (b) comprised of isobutylene as a constituent monomer and constituting the block copolymer (A) toward the higher end of the temperature scale. Therefore, when it is desirable to reduce the formulating amount of the tackifying resin, a resin with a higher softening point can be selected, while a resin with a lower softening point can be judiciously chosen when the formulating amount of the tackifying resin is to be increased.

The formulating amount of the tackifying resin, when used, is not particularly restricted but is generally 1 to 1000 weight parts and, from the standpoint of performance of the composition, is preferably 1 to 100 weight parts, relative to 100 weight parts of the block polymer (A).

The plasticizer may be any of petroleum process oils such as paraffin process oil, naphthene process oil, aromatic process oil, etc., dibasic acid dialkyl esters such as diethyl phthalate, dioctyl phthalate, dibutyl adipate, etc., and low-molecular-weight liquid polymers such as liquid polybutene, liquid polyisoprene and so on. Such a plasticizer as above is effective in shifting the Tg of the polymer block comprised of isobutylene as a constituent monomer toward the lower end of the temperature scale, and for such purposes, it is preferable to formulate a plasticizer compatible with the polymer block (b) comprised of isobutylene as a constituent monomer and constituting the block copolymer (A). Thus, paraffin process oil or liquid polybutene, for instance, can be used with advantage.

The formulating amount of the plasticizer, when used, is not particularly restricted but is generally 1 to 1000 weight parts and, from the standpoint of performance of the composition, is preferably 1 to 100 weight parts, based on 100 weight parts of the block copolymer (A).

As examples of the filler, there can be mentioned powdered fillers such as, for example, mica, carbon black, silica, calcium carbonate, talc, graphite, stainless steel and aluminum powders; and fibrous fillers such as glass fiber and metal fiber. Among these, mica is particularly preferred because it contributes to improvement in damping capacity. Furthermore, when a metal powder, such as stainless steel powder and aluminum powder, a metal fiber, or an electrically conductive powder, such as carbon black and graphite, is formulated, spot welding is made feasible.

As other formulating additives, there can be mentioned stabilizers such as triphenyl phosphite, hindered phenol, dibutyltin maleate, etc.; lubricants such as polyethylene wax, polypropylene wax, montanic acid wax, etc.; flame retardants such as triphenyl phosphate, tricresyl phosphate, decabromobiphenyl, decabromobiphenyl ether, antimony trioxide, etc.; and pigments such as titanium oxide, zinc sulfide, zinc oxide and so on.

The preferred damper material composition according to the first aspect of the present invention is a composition comprising the block copolymer (A) as well as at least one of the thermoplastic resin (C) and thermoplastic elastomer (D) and in a weight ratio of 100/0 to 30/70 based on 100 weight parts of the mixture, and containing 5 to 200 weight parts of the tackifying resin and/or plasticizer. The more preferred is a composition comprising the block copolymer (A) as well as at least one of the thermoplastic resin (C) and thermoplastic elastomer (D) in a weight ratio of 95/5 to 40/60 based on 100 weight parts of the mixture, and containing 10 to 150 weight parts of the tackifying resin and/or plasticizer. Particularly preferred is a composition comprising the block copolymer (A) as well as at least one of the thermoplastic resin (C) and thermoplastic elastomer (D) in a weight ratio of 90/10 to 50/50 based on 100 weight parts of the mixture, and containing 5 to 100 weight parts of the tackifying resin and/or plasticizer.

When at least one of the thermoplastic resin (C) and thermoplastic elastomer (D) is not formulated, the cohesive force of the damper material composition is so small that the composition tends to be deficient in deformability. On the other hand, if the addition amount is too high, the cohesive force of the damper material composition will become so large as to cause a relative decrease in the adhesion to steel, thus leading to insufficient adhesion.

The tackifying resin and plasticizer are formulated for the purpose of adjusting the glass transition temperature and controlling the temperature dependence of rigidity and damping capacity of the damper material composition. However, there are cases in which the rigidity is decreased with an increasing addition amount. Therefore, if the addition amount is too high, a rigidity sufficient to retain the shape may not be maintained.

The second aspect of the present invention is directed to a damper material composition comprising a diblock copolymer (A') comprising a polymer block (a') and a polymer block (b), said polymer block (a') being comprised of an aromatic vinyl compound as a constituent monomer and having a number average molecular weight of not more than 10,000 and said polymer block (b) being comprised of isobutylene as a constituent monomer.

The polymer block (a') is a polymer block comprised of an aromatic vinyl compound as a constituent monomer and having a number average molecular weight of not more than 10,000. As this requirement relating to number average molecular weight is satisfied, a damping material having hot-melt processability (showing a low melt viscosity under heating at a high temperature) can be obtained. When the number average molecular weight is higher than 10,000, the polymer block does not melt even when heated to a high temperature so that the composition does not lend itself well to hot-melt processing, although the damper may have a good balance between damping capacity and temperature dependence of rigidity at and around room temperature. To improve hot-melt processability, the tackifier and/or plasticizer may be formulated in an increased amount to thereby lower the melt viscosity at high temperature but such a practice is not recommendable because the balance between damping capacity and temperature dependence of rigidity at and around room temperature would then be adversely affected.

The number average molecular weight of the polymer block (a') is preferably not more than 9,000, more preferably not more than 8,000. Also, it is preferably not less than 1,000, more preferably not less than 2,000. When the number average molecular weight of the polymer block (a') is too low, the balance between damping capacity and temperature dependence of rigidity at and around room temperature tends to be adversely affected.

The procedure for calculation of the number average molecular weight of the polymer block (a') is dependent on the method for production (polymerization) of the diblock copolymer (A'). Thus, when the copolymer is synthesized by polymerizing a monomer component containing an aromatic vinyl compound in the first place and, then, further polymerizing a monomer component containing isobutylene, the number average molecular weight of the polymer available on polymerization of said monomer component containing an aromatic vinyl compound is used. On the other hand, when the copolymer (A') is synthesized by polymerizing the isobutylene-containing monomer component in the first place and, then, further polymerizing said monomer component containing an aromatic vinyl compound, the number average molecular weight of polymer block (a') is the value calculated by means of the formula: (number average molecular weight of the end-product copolymer)—(the number average molecular weight of the polymer available on polymerization of the isobutylene-containing monomer component). Furthermore, when the molecular weight distribution of the end-product copolymer is sufficiently small, the computation formula: (number average molecular weight of the end-product copolymer)×(styrene content (weight %) of diblock copolymer (A'))/100 may be employed.

It should be understood that, as used in this specification, the term "number average molecular weight" is the value measured by gel permeation chromatography and expressed in polystyrene equivalent.

The constituent monomer component of the polymer block (a') may be the same as that mentioned for polymer block (a) in the block copolymer (A).

The polymer block (b) of the diblock copolymer (A') according to the second aspect of the invention may be the same as the polymer block (b) described hereinbefore. Its number average molecular weight is not particularly restricted but preferably such that the number average molecular weight of the whole diblock copolymer (A') will assume a suitable value.

The ratio of the polymer block (a') comprised of an aromatic vinyl compound as a constituent monomer to the polymer block (b) comprised of isobutylene as a constituent monomer in the diblock copolymer (A') is not particularly restricted but, in terms of the balance between physical state and processability, the weight ratio of polymer block (a')/polymer block (b) is preferably 5/95 to 40/60, more preferably 10/90 to 40/60.

The number average molecular weight of the diblock copolymer (A') is not particularly restricted but, from the standpoint of physical properties and processability, is preferably 3,000 to 200,000, more preferably 5,000 to 50,000. When the number average molecular weight is less than the above range, the composition cannot fully express its physical characteristics. On the other hand, when it exceeds the above range, processability is poor.

For the purpose of improving the adhesion of the composition according to the second aspect of the invention to steel sheets and pipes, for instance, diblock copolymers having various functional groups internally or terminally of the molecular chain can be used as said diblock copolymer (A'). The functional groups may be the same as those mentioned hereinbefore.

The method of producing the diblock copolymer (A') may be the same as the technology described hereinbefore for the production of the diblock copolymer (A).

The diblock copolymer (A') content of the damper material composition according to the second aspect of the invention should vary with different components used concomitantly and cannot be stated in general terms but is preferably not less than 20 weight %, more preferably not less than 30 weight %. Below the above range, the balance between damping capacity and temperature dependence of rigidity at and around room temperature tends to be adversely affected.

The damper material composition of this invention need only be a composition which comprises a diblock copolymer (A') comprising said polymer block (a') comprised of an aromatic vinyl compound as a constituent monomer and having a number average molecular weight of not more than 10,000 and said polymer block (b) comprised of isobutylene as a constituent monomer and may contain any other optional component other than the diblock copolymer (A'). Such optional components include thermoplastic polymers such as thermoplastic elastomers and thermoplastic resins, tackifying resins, plasticizers, fillers and stabilizers which have already been mentioned and the formulating amounts thereof may also be the same as those mentioned hereinbefore.

Addition of a thermoplastic elastomer, in particular, is effective in enhancing the cohesive force and increasing the breaking strain of the diblock copolymer (A'). Addition of a thermoplastic resin is effective in increasing the rigidity of the diblock copolymer (A'). Addition of a tackifying resin and/or a plasticizer is effective in improving the damping capacity and hot-melt processability of the diblock copolymer (A'). Further, the damping capacity and rigidity can be modulated by adding said filler and the thermal stability during processing and long-term durability can be improved by adding said stabilizer.

For application to a vibration damper, the damper material composition is required to have a high damping capacity and a small temperature dependence of rigidity at and around room temperature. Therefore, the damper material composition according to the second aspect of the invention is preferably such that the ratio of the storage modulus (G') value at 10° C. to the corresponding value at 30° C. as found by a dynamic viscoelasticity measurement in the shear mode, namely ($G'_{10°\ C.}/G'_{30°\ C.}$), is not more than 5 and the loss tangent (tan δ) value found by said measurement is not less than 0.4 at 10° C. to 30° C.

Thus, in the damper material composition of this invention, the ratio ($G'_{10°\ C.}/G'_{30°\ C.}$) of the G' value at 10° C. ($G'_{10°\ C.}$) to the G' value at 30° C. ($G'_{30°\ C.}$) is preferably not more than 5, more preferably not more than 4, still more preferably not more than 2. Furthermore, in the damper material composition of the invention, the tan δ value at 10° C. to 30° C. is preferably not less than 0.4, more preferably not less than 0.5, still more preferably not less than 0.7.

The method of producing the damper material composition of the invention is not particularly restricted but includes a method comprising mixing the components mechanically by means of a mixing roll, a Banbury mixer, a kneader, a melting furnace equipped with a stirrer, or a single-screw or twin-screw extruding machine. This mixing procedure may optionally be carried out under heating. An alternative method comprises pouring the components in a suitable solvent, stirring the mixture to give a homogeneous solution of the composition and distilling off the solvent. Where necessary, the damper material composition can be molded and crosslinked by means of a press, for instance.

The damper material composition of the invention can be used in combination with steel sheets or pipes to provide architectural dampers. The kind of steel sheet or pipe which can be used for such dampers is not restricted but includes general-purpose structural steel sheets, cold rolled steel sheets, carbon steel sheets, stainless steel sheets and low-alloyed steel sheets, among others. The structure of a vibration damper may for example be a laminate structure comprising at least one layer of the damper material composition of the invention and the same number plus one steel sheets as alternately laminated or a laminate structure comprising at least one layer of the damper material composition of the invention and the same number plus one steel pipes as similarly laminated in a concentric manner.

In these cases, the damper material composition and steel sheet or pipe may be bonded together with an adhesive or without the aid of an adhesive.

Thickness of the damping material of the vibration damper can be selected according to the shearing force and deformation volume required for the damper. Said thickness is generally within the range of 3 mm to 20 mm. When the thickness is smaller than 3 mm, the damper cannot deal with a large deformation due to an earthquake and the like to cause the failure thereof. When the thickness is larger than 20 mm, the rigidity and shearing force of the damper tend to be too small.

The damping material can be molded by standard extruders, press-molders, hot-roller and the like. Molded products in the form of a sheet or tape may be adhered with steel sheets or pipes. For example, when extruders are used for molding, the screw temperature may be 80 to 200° C. and the die temperature may be 50 to 150° C. Furthermore, the vibration molders may have a conventional shape, for example, those in the shape of diagonal brace, those in the shape of puncheon and those in the shape of wall.

When the damper material composition has good hot-melt processability, it is possible to use a technique which comprises interposing the damper material composition between steel sheets or pipes and heating the whole in an electric furnace, for instance, to cause the composition to melt and flow. An alternative technique comprises pouring the damper material composition, previously molten, into the clearance between steel sheets or pipes to fill up the clearance and bond them together. The melting may be effected generally within the temperature range of 150 to 300° C.

Furthermore, because the damper material composition of the invention has adhesive properties, it can be molded into a tape for use as a double-sided self-adhesive tape having a damping function. As such a double-sided self-adhesive tape having a vibration damping function is set between steel sheets, between wood members, or between a wood member and a gypsum board, for instance, both sides of the tape stick to the respective adherends and, in this mode of use, the damper material composition may undergo shear deformation in response to the vibrations caused by a wind or an earthquake, thus insuring a vibration damping effect in an expedient manner.

The size of the self-adhesive tape may usually be 2 cm to 10 cm in width and 0.3 mm to 3.0 mm in thickness. Formation of the tape can be carried out with a standard extruder using a screw temperature of 80 to 200° C. and a die temperature of 50 to 150° C.

DESCRIPTION OF LEGENDS

Figure 1:
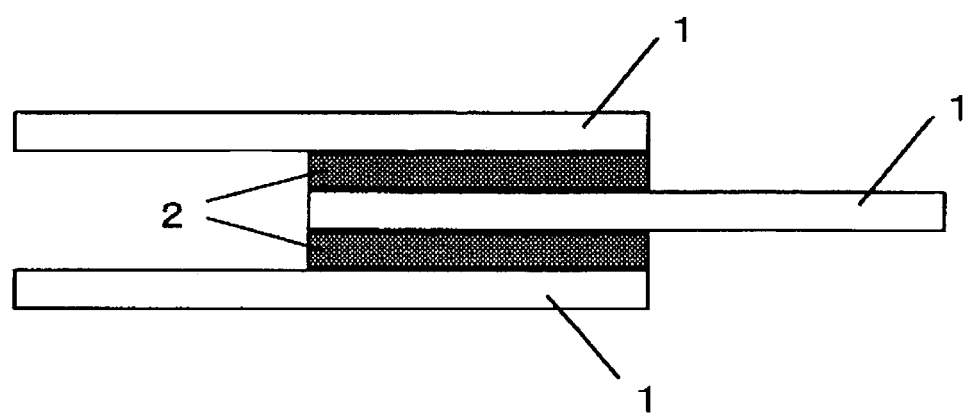
FIG. 1 is a sectional view showing a small-sized viscoelastic damper comprising 2 damper material composition layers and 3 steel sheets as laminated in an alternate manner and used in the measurement of damping performance of the viscoelastic damper.

1: Surface-treated steel sheet
2: Damping material

BEST MODE FOR CARRYING OUT THE INVENTION

The following examples illustrate the present invention in further detail. It is to be understood that the invention is by no means delimited by these examples but can be judiciously modified without departing from its spirit and principles herein disclosed.

PRODUCTION EXAMPLE 1

Production of a Diblock Copolymer Comprising a Polystyrene Block and a Polyisobutylene Block A 2 L reactor equipped with a stirrer was charged with 589 mL of methylcyclohexane (dried with molecular sieves in advance), 613 mL of n-butyl chloride (dried with molecular sieves in advance) and 0.550 g of cumyl chloride. After the reactor was cooled to −70° C., 0.35 mL of α-picoline (2-methylpyridine) and 179 mL of isobutylene were added. Then, 9.4 mL of titanium tetrachloride was added and the polymerization was thus started. The reaction was carried out at −70° C. with constant stirring for 2.0 hours. To this reaction mixture was added 59 mL of styrene, and the reaction was further continued for 60 minutes, at the end of which time it was stopped by adding a large quantity of methanol. The solvent was removed from the reaction mixture and the polymer was dissolved in toluene and washed with 2 portions of water. The washed toluene solution was poured in methanol to precipitate the polymer, which was then dried in vacuo at 60° C. for 24 hours to give a diblock copolymer (hereinafter referred to briefly as SIB-1).

The diblock copolymer thus obtained had a number average molecular weight (Mn) of 48,000 and a molecular weight distribution (Mw/Mn) of 1.12. The number average molecular weight and molecular weight distribution values were determined using Wasters 510 GPC system (solvent: chloroform, flow rate 1 mL/min). The molecular weight was expressed in polystyrene equivalent (the same applies hereinafter).

PRODUCTION EXAMPLE 2

Production of a Triblock Copolymer Comprising a Polystyrene Block, a Polyisobutylene Block and a Polystyrene Block A 2 L reactor equipped with a stirrer was charged with 570 mL of methylcyclohexane (dried with molecular sieves in advance), 590 mL of n-butyl chloride (dried with molecular sieves in advance) and 0.400 g of dicumyl chloride. After the reactor was cooled to −70° C., 0.34 mL of α-picoline (2-methylpyridine) and 174 mL of isobutylene were added. Then, 10.3 mL of titanium tetrachloride was added and the polymerization was thus started. The reaction was carried out at −70° C. with constant stirring for 2.0 hours. To this reaction mixture was added 58 mL of styrene, and the reaction was further continued for 60 minutes, at the end of which time it was stopped by adding a large quantity of methanol. The solvent was removed from the reaction mixture and the polymer was dissolved in toluene and washed with 2 portions of water. The washed toluene solution was poured in methanol to precipitate the polymer, which was then dried in vacuo at 60° C. for 24 hours to give a triblock copolymer (hereinafter referred to briefly as SIBS-1).

The triblock copolymer thus obtained had a number average molecular weight of 98,000 and a molecular weight distribution value of 1.15.

EXAMPLES 1 TO 8 AND COMPARATIVE EXAMPLES 1 TO 7

The block copolymer (A) (SIB-1 prepared in Production Example 1), a thermoplastic elastomer, a thermoplastic resin, a tackifying resin, and a plasticizer were kneaded together according to the formulas indicated in Table 1 using a Labo-Plastomill (manufactured by Toyo Precision Machinery) set at 170° C. for 15 minutes to manufacture rubber compositions. The rubber compositions were respectively press-molded at 170° C. to prepare sheets. The moldability was excellent. From each sheet, specimens measuring 5 mm×6 mm×1.7 mm were cut out.

(Measurement of Dynamic Viscoelasticity)

Using 2 specimens, the dynamic viscoelasticity of each composition was measured at a frequency of 0.5 Hz and a shear strain of 0.05% in accordance with JIS K-6394. As the measuring instrument, the dynamic viscoelasticity meter DVA-200 (manufactured by IT Metric Control) was used. With regard to storage modulus (G'), the ratio of the value of G' at 0° C. ($G'_{0°\,C.}$) to the value of G' at 40° C. ($G'_{40°\,C.}$), namely ($G'_{0°\,C.}/G'_{40°\,C.}$), and the ratio of the value of G' at 10° C. ($G'_{10°\,C.}$) to the value of G' at 30° C. ($G'_{30°\,C.}$), namely ($G'_{10°\,C.}/G'_{30°\,C.}$), were calculated. Moreover, with regard to loss tangent (tan δ), the values at 0° C., 10° C., 20° C., 30° C. and 40° C. ($\tan \delta_{10°\,C.}$, $\tan \delta_{20°\,C.}$, $\tan \delta_{30°\,C.}$, $\tan \delta_{40°\,C.}$) were read.

(Evaluation of Vibration-Damping Performance)

The temperature dependence of rigidity as well as the damping performance at and around room temperature were rated according to the following 3-grade evaluation schedule.

[Evaluation Schedule]
○: Good
□: Usable as architectural viscoelastic damper
X: Not usable as architectural viscoelastic damper (Evaluation of Adhesion and Deformability)

From a sheet of the test damper material composition, a specimen measuring 25 mm×25 mm×2 mm thick was cut out and bonded as sandwiched between two 25 mm×100 mm×5 mm thick general-purpose structural steel sheets (SS400 (JIS G-3101)) sandblasted in advance for surface treatment to fabricate a shear test specimen. When the damper material composition was self-adhesive, the sheet was sandwiched and melt-bonded at 150° C. by means of a hot press. When the damper material composition was not self-adhesive, steel sheets were coated with the adhesive Chemlock487A/B (product of Lord Far East Incorporated) and after 1 hour of drying at room temperature, the sheet were bonded. In this case, to accelerate the curing of the adhesive applied, the assembly was heated in an oven at 100° C. for 10 minutes and left sitting at room temperature for 24 hours.

The specimen thus prepared was pulled in the shear direction at a speed of 300 mm/min using Autograph AG-10TB (Shimadzu Corporation). The adhesion was evaluated according to whether the damper material composition sheet and steel sheet are peeled apart across the interface or the damper material composition sheet was destroyed. In the event of interfacial separation, the product cannot be used as an architectural damper because it will be subjected to a large force in an earthquake.

In the case of destruction of the sheet, the maximum strain up to failure was measured to evaluate the deformability.

In Table 1, "Fusion" means melt-bonding and "Adhesive" means bonding with the aid of an adhesive. Further, "Material" means the failure of the damping material and "Interface" means peeling across the interface between the damper sheet and steel sheet.

The results are shown in Table 1.

TABLE 1

| | | Example | | | | | | | | |
|---|---|---|---|---|---|---|---|---|---|---|
| | | 1 | 2 | 3 | 4 | 5 | 6 | 7 | 8 | |
| Formulation, parts by weight | Block copolymer (A): | | | | | | | | | |
| | SIB-1 | 100 | 80 | 80 | 80 | 80 | 80 | 80 | 80 | |
| | Thermoplastic elastomer: | | | | | | | | | |
| | SIBS-1 | — | 20 | 20 | — | — | — | — | — | |
| | SEPS | — | — | — | 20 | 20 | — | — | — | |
| | VS1 | — | — | — | — | — | — | — | — | |
| | HSV3 | — | — | — | — | — | — | — | — | |
| | SEBS | — | — | — | — | — | — | — | — | |
| | Thermoplastic resin: | | | | | | | | | |
| | ECC | — | — | — | — | — | 20 | 20 | — | |
| | EVA | — | — | — | — | — | — | — | 20 | |
| | Tackifying resin: | | | | | | | | | |
| | P-100 | 30 | 30 | — | 30 | 50 | 30 | 50 | 30 | |
| | P-140 | — | — | — | — | — | — | — | — | |
| | Plasticizer: | | | | | | | | | |
| | PW380 | — | — | 30 | — | 40 | — | 40 | — | |
| | 300H | — | — | — | — | — | — | — | — | |
| | Filler: SC-60 | — | — | — | — | — | — | — | — | |
| Performance evaluation | Storage modulus ratio ($G'_{10°C}/G'_{30°C}$) | 2.4 | 2.5 | 2.2 | 2.1 | 1.4 | 2.9 | 2.7 | 3.1 | |
| | Storage modulus ratio ($G'_{0°C}/G'_{40°C}$) | 7.4 | 7.4 | 4.1 | 5.2 | 2.2 | 4.3 | 9.0 | 11.8 | |
| | Temp. dependence of rigidity | ○ | ○ | ○ | ○ | ○ | ○ | ○ | Δ | |
| | Loss tangent | | | | | | | | | |
| | (0° C.) | 1.22 | 1.22 | 0.50 | 0.92 | 0.99 | 0.98 | 1.21 | 1.12 | |
| | (10° C.) | 0.93 | 0.97 | 0.58 | 0.73 | 0.59 | 0.89 | 0.92 | 1.04 | |
| | (20° C.) | 0.77 | 0.75 | 0.68 | 0.60 | 0.52 | 0.74 | 0.80 | 0.85 | |
| | (30° C.) | 0.73 | 0.68 | 0.70 | 0.56 | 0.55 | 0.67 | 0.90 | 0.75 | |
| | (40° C.) | 0.80 | 0.68 | 0.63 | 0.60 | 0.71 | 0.69 | 1.05 | 0.75 | |
| | Damping performance | ○ | ○ | Δ | Δ | Δ | ○ | ○ | ○ | |
| | Method of bonding | Melt-bonding | Melt-bonding | Melt-bonding | Melt-bonding | Melt-bonding | Melt-bonding | Melt-bonding | Melt-bonding | |
| | Adhesion (type of failure) | Material | Material | Material | Material | Material | Material | Material | Material | |
| | Deformability (%) (destruction strain) | 90 | 580 | 550 | 580 | 980 | 190 | 180 | 170 | |

| | | Comparative Example | | | | | | |
|---|---|---|---|---|---|---|---|---|
| | | 1 | 2 | 3 | 4 | 5 | 6 | 7 |
| Formulation, parts by weight | Block copolymer (A): | | | | | | | |
| | SIB-1 | — | — | — | — | — | — | — |
| | Thermoplastic elastomer: | | | | | | | |
| | SIBS-1 | 100 | 100 | 100 | 100 | — | — | — |
| | SEPS | — | — | — | — | — | — | — |
| | VS1 | — | — | — | — | 100 | — | — |
| | HSV3 | — | — | — | — | — | 100 | — |
| | SEBS | — | — | — | — | — | — | 100 |
| | Thermoplastic resin: | | | | | | | |
| | ECC | — | — | — | — | — | — | — |
| | EVA | — | — | — | — | — | — | — |
| | Tackifying resin: | | | | | | | |
| | P-100 | — | — | 25 | — | — | — | — |
| | P-140 | — | — | — | 50 | — | — | — |
| | Plasticizer: | | | | | | | |
| | PW380 | — | — | — | — | — | — | — |
| | 300H | — | 15 | — | — | — | — | — |
| | Filler: SC-60 | — | 50 | — | — | — | — | — |

TABLE 1-continued

| Performance evaluation | | | | | | | | |
|---|---|---|---|---|---|---|---|---|
| Storage modulus ratio ($G'_{10°C}/G'_{30°C}$) | | 1.2 | 1.3 | 1.6 | 6.2 | 39.8 | 1.8 | 1.1 |
| Storage modulus ratio ($G'_{0°C}/G'_{40°C}$) | | 1.4 | 1.6 | 2.6 | 34.5 | 65.6 | 5.9 | 1.3 |
| Temp. dependence of rigidity | | ○ | ○ | ○ | X | X | ○ | ○ |
| Loss tangent | | | | | | | | |
| (0° C.) | | 0.31 | 0.43 | 0.90 | 0.46 | 0.20 | 1.36 | 0.08 |
| (10° C.) | | 0.21 | 0.29 | 0.59 | 0.51 | 0.31 | 0.69 | 0.06 |
| (20° C.) | | 0.17 | 0.20 | 0.41 | 0.79 | 1.37 | 0.34 | 0.05 |
| (30° C.) | | 0.15 | 0.16 | 0.31 | 0.95 | 0.66 | 0.20 | 0.04 |
| (40° C.) | | 0.14 | 0.17 | 0.25 | 1.03 | 0.32 | 0.14 | 0.04 |
| Damping performance | | X | X | X | ○ | X | X | X |
| Method of bonding | | Adhesive | Adhesive | Adhesive | Adhesive | Adhesive | Adhesive | Adhesive |
| Adhesion (type of failure) | | Interface | Interface | Interface | Interface | Interface | Interface | Interface |
| Deformability (%) (destruction strain) | | — | — | — | — | — | — | — |

Particulars of the thermoplastic elastomer, thermoplastic resin, tackifying resin, plasticizer and filler mentioned in Table 1 are as follows.

Thermoplastic elastomer: SEPS (styrene-ethylene/propylene-styrene triblock copolymer [SEPTON 2007, product of Kuraray Co.]

Thermoplastic elastomer: VS1 (high-vinyl styrene-isoprene block copolymer, HYBLAR VS-1, styrene content 20% [product of Kuraray Co.]

Thermoplastic elastomer: HVS3 (hydrogenated high-vinyl styrene-isoprene block copolymer, HYBLAR HVS-3, styrene content 20% [product of Kuraray Co.]

Thermoplastic elastomer: SEBS (hydrogenated styrene-butadiene block copolymer, CRAYTON G-1650, styrene content 29% [product of Shell Japan Co.]

Thermoplastic resin: EOC (ethylene-octene copolymer (EN-GAGE 8150, product of Dow)

Thermoplastic resin: EVA (ethylene-vinyl acetate copolymer (EV260, product of Mitsui-DuPont)

Tackifying resin: P-100 (hydrogenated C9 alicyclic petroleum resin, ARCON P-100, softening point 100° C., molecular weight 610 (product of Arakawa Chemical Industry)

Tackifying resin: P-140 (hydrogenated C9 alicyclic petroleum resin, ARCON P-140, softening point 140° C., molecular weight 860 (product of Arakawa Chemical Industry)

Plasticizer: PW-380 (paraffinic oil, Diana Process Oil PW-380, viscosity 380 cSt (40° C.), density 0.8769 g/cm$^3$, pour point −15° C. (product of Idemitsu Kosan)

Plasticizer: 300H (polybutene oil, Idemitsu Polybutene 300H, viscosity 32,000 cSt (40° C.), density 0.900 g/cm$^3$, pour point 0° C. (product of Idemitsu Petrochemical)

Filler: SC-60 (flaky graphite SC-60 (product of Nakagoshi Graphite)

All the compositions according to Examples 1 to 8 not only had tan δ values as high as not less than 0.4 within the range of 0° C. to 40° C. but also ($G'_{0°C}/G'_{40°C}$) ratios as small as not more than 15 so that they had a good balance between damping capacity and temperature dependence of rigidity at and around room temperature and can, therefore, be used with advantage as damping materials for architectural viscoelastic dampers. Such effects are attributable to the marked improvements in tan δ at temperatures not below 20° C., particularly at 30° C. to 40° C.

In Examples 4 and 5 where SEPS was used in lieu of the SIBS-1 used in Examples 2 and 3, the balance between tan δ and G' was superior as compared with Examples 2 and 3. In particular, improvements in the ($G'_{0°C}/G'_{40°C}$) ratio were remarkable. In Examples 6 and 7, EOC was used in lieu of the SIBS-1 in Examples 2 and 3, and EVA was used in Example 8. In these formulations, too, improvements were obtained in tan δ at temperatures not below 20° C., particularly at 30° C. and 40° C. Further, in Example 8 where EVA was used, a tendency toward improved adhesion between the damper material composition and the steel sheet was observed.

The damper material compositions according to Examples 1 to 8 invariably had self-adhesive properties and could be melt-bonded to steel sheets without the aid of an adhesive. Moreover, the resulting bond at an interface between the steel sheet and damper material composition was very satisfactory and the type of failure was invariably the failure of the damping material. Furthermore, the compositions according to Examples 2 to 8 wherein the thermoplastic resin and thermoplastic elastomer were added to the damper material composition of Example 1 showed a tendency toward improved deformability.

On the other hand, Comparative Example 1 in which only the isobutylene-based block copolymer described specifically in WO 93/14135 and Japanese Kokai Publication Hei-7-137194 was used as the damping material and Comparative Example 2 in which the isobutylene-based block copolymer/polybutene/flaky graphite=100/15/50 (by weight) composition described specifically in WO 93/14135 was used as the damping material both showed low tan δ values at and around room temperature and did not have the characteristics required of damping materials for architectural viscoelastic damper use. Comparative Example 3 in which the isobutylene-based block copolymer/ARCON P-100=100/25 (by weight) composition described specifically in Japanese Kokai Publication Hei-7-137194 was used as the damping material showed high tan δ values over 0° C. to 10° C. but unduly low tan δ values at temperatures not below 20° C. so that it cannot be used as a damping composition for architectural viscoelastic damper use. Comparative Example 4 in which the kind and formulating amount of tackifying resin were optimized to improve tan δ values at and around room temperature, the tan δ values at temperatures not below 20° C. were improved but the temperature dependence of rigidity was increased. Thus, according to the prior art technology, it is impossible to strike a balance between damping capacity and temperature dependence of rigidity at and around room temperature.

Furthermore, the conventional compositions have no self-adhesive properties and, even when bonded to a steel sheet with the aid of an adhesive, the laminate shows an interfacial failure and cannot be used as an architectural vibration damper. Thus, when an architectural damper undergoes a shear deformation in an earthquake, a force commensurate with the amount of deformation is generated but if an interfacial failure takes place when the deformation has become large, the stress from the damper is abruptly relieved so that a large load is imposed on the building.

It was also found that as shown in Comparative Examples 5 to 7, the thermoplastic elastomers known to be useful for ordinary damper materials do not provide for the characteristics required of damping materials for architectural viscoelastic dampers.

EXAMPLE 9

Figure 2:
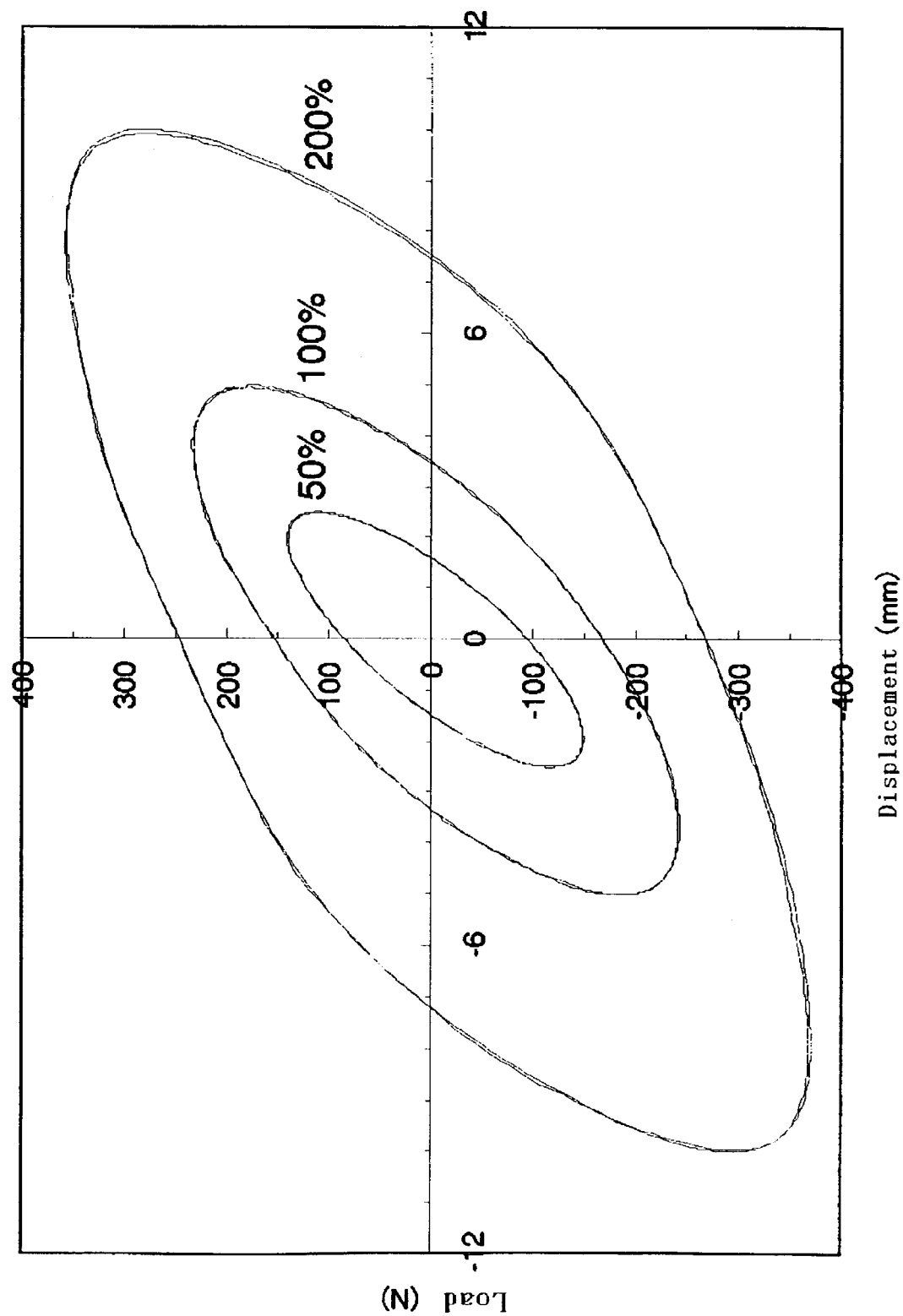
FIG. 2 shows hysteresis loops showing the load-displacement relationship representing the damping performance of the viscoelastic damper fabricated in Example 9.

Using 50×50×5 mm sheets prepared from the composition of Example 5 and 50 mm×100 mm×7 mm surface-treated steel sheets prepared by the sandblasting of general-purpose structural rolled steel sheets [SS400 (JISG-3101)], the surfaces of which were coated with the adhesive Chemlock 487A/B (product of Lord Far East Incorporated) and dried at room temperature for 1 hour, a small-sized viscoelastic damper was fabricated by bonding together two of said damping sheets and three of said steel sheets in the alternating manner illustrated in FIG. 1. To promote curing of the adhesive, the damper was heated in an oven at 100° C. for 10 minutes and, then, left sitting at room temperature for 24 hours. The viscoelastic damper thus completed was set with a jig on a vibrating machine and a dynamic vibration test was carried out. MTS's 831 Elastomer Test System was used as the tester and an incubator was used for temperature control. The test conditions were: frequency 0.5 Hz, strains 50%, 100% and 200%, temperatures 0° C., 10° C., 20° C., 30° C. and 40° C. The equivalent rigidity (Keq) and equivalent damping factor (heq) values calculated from the resulting hysteresis curves are shown in Table 2 and the hysteresis loops at 20° C. are shown in FIG. 2.

The equivalent damping factor (heq) is a value used for the damping capacity of a damper device for use in buildings. It is calculated from the hysteresis loops constructed by giving effective design displacements to a damping device. Thus, referring to FIG. 2, "heq" is a value calculated by means of the following formula.

$$heq = \Box W / 2_\pi W$$

where

W: the elastic energy of the damping device (unit: tf•m)

□W: the rigidity of the energy absorbed by the damping device (the area of the hysteresis loop shown in FIG. 2. Unit: tf•m)

Equivalent rigidity (Keq), which is an indicator of rigidity of the damping material, is the gradient of a straight line drawn from the origin to the (load, effective design displacement) shown in FIG. 2.

TABLE 2

| | | Strain | | |
|---|---|---|---|---|
| | | 50% | 100% | 200% |
| Keq (0° C.) | MPa | 0.079 | 0.058 | 0.039 |
| Keq (10° C.) | MPa | 0.043 | 0.034 | 0.026 |
| Keq (20° C.) | MPa | 0.046 | 0.036 | 0.027 |
| Keq (30° C.) | MPa | 0.037 | 0.030 | 0.023 |
| Keq (40° C.) | MPa | 0.026 | 0.021 | 0.017 |
| Keq (10° C.)/Keq (30° C.) | — | 1.2 | 1.2 | 1.1 |
| Keq (0° C.)/Keq (40° C.) | — | 3.1 | 2.7 | 2.3 |
| heq (0° C.) | — | 0.38 | 0.48 | 0.57 |
| heq (10° C.) | — | 0.41 | 0.47 | 0.51 |
| heq (20° C.) | — | 0.40 | 0.46 | 0.51 |
| heq (30° C.) | — | 0.40 | 0.45 | 0.48 |
| heq (40° C.) | — | 0.36 | 0.40 | 0.43 |

It will be apparent from Table 2 that, in the actual measurement of damper performance, too, the viscoelastic damper fabricated from the composition of the invention is low in the temperature dependence of rigidity and shows high damping capacities at and around room temperature. It can also be seen in FIG. 2 that the viscoelastic damper fabricated from the composition of the invention is an excellent architectural viscoelastic damper giving a hysteresis loop undergoing a concentric expansion according to a varying strain and, therefore, having a small strain dependence (high linearity).

PRODUCTION EXAMPLE 3 TO 5

Production of Diblock Copolymers Comprising a Polystyrene Block and a Polyisobutylene Block A 2 L reactor equipped with a stirrer was charged with 589 mL of methylcyclohexane (dried with molecular sieves in advance), 613 mL of n-butyl chloride (dried with molecular sieves in advance) and 0.550 g of cumyl chloride. After the reactor was cooled to −70° C., 0.35 mL of α-picoline (2-methylpyridine) was added, further followed by addition of isobutylene in the amount indicated in Table 3. Then, 9.4 mL of titanium tetrachloride was added and the polymerization was thus started. The reaction was carried out at −70° C. with constant stirring for 2.0 hours. To this reaction mixture was added styrene in the amount indicated in Table 3, and the reaction was further continued for 60 minutes, at the end of which time the reaction was stopped by adding a large quantity of methanol. The solvent was removed from the reaction mixture and the polymer was dissolved in toluene and washed with 2 portions of water. The toluene solution was poured in methanol to precipitate the polymer, which was then dried in vacuo at 60° C. for 24 hours to give a diblock copolymer comprising a polystyrene block and a polyisobutylene block (hereinafter referred to briefly as SIB-2 to SIB-4).

TABLE 3

| | Production Ex. 3 | Production Ex. 4 | Production Ex. 5 |
|---|---|---|---|
| Diblock copolymer | SIB-2 | STB-3 | SIB-4 |
| Isobutylene (g) | 60.7 | 120.9 | 99.6 |
| Styrene (g) | 11.1 | 21.9 | 42.6 |
| Mn after polymerization of isobutylene (Mw/Mn) | 19100 (1.05) | 35200 (1.07) | 29900 (1.07) |

TABLE 3-continued

|  | Production Ex. 3 | Production Ex. 4 | Production Ex. 5 |
|---|---|---|---|
| Mn after polymerization of styrene (MW/Mn) | 22700 (1.11) | 42500 (1.17) | 43100 (1.18) |
| Mn of polystyrene block | 3600 | 7300 | 13200 |
| Styrene content (wt %) of copolymer | 15 | 16 | 31 |

PRODUCTION EXAMPLE 6

Production of a Triblock Copolymer Comprising a Polystyrene Block, a Polyisobutylene Block and a Polystyrene Block A 2 L reactor equipped with a stirrer was charged with 570 mL of methylcyclohexane (dried with molecular sieves in advance), 590 mL of n-butyl chloride (dried with molecular sieves in advance) and 0.400 g of dicumyl chloride. After the reactor was cooled to −70° C., 0.34 mL of α-picoline (2-methylpyridine) and 174 mL of isobutylene were added. Then, 10.3 mL of titanium tetrachloride was added and the polymerization was thus started. The reaction was carried out at −70° C. with constant stirring for 2.0 hours. To this reaction mixture was added 58 mL of styrene, and the reaction was further continued for 60 minutes, at the end of which time the reaction was stopped by adding a large quantity of methanol. The solvent was removed from the reaction mixture and the polymer was dissolved in toluene and washed with 2 portions of water. The toluene solution was poured in methanol to precipitate the polymer, which was then dried in vacuo. at 60° C. for 24 hours to give a triblock copolymer (hereinafter referred to briefly as SIBS-2).

In the SIBS-2 thus obtained, the number average molecular weight after polymerization of isobutylene was 69,000 (Mw/Mn=1.10), the number average molecular weight after polymerization of styrene was 98,000 (Mw/Mn=1.15), the molecular weight of the polystyrene block was 14,500, and the styrene content was 30 weight %.

EXAMPLES 10 TO 19 AND COMPARATIVE EXAMPLE 8

Using Labo-Plastomill (manufactured by Toyo Precision Machinery) set at 170° C., the block copolymer (A) (SIB-2 to SIB-4 as produced in Production Examples 3 to 5), thermoplastic elastomer, thermoplastic resin, tackifying resin and plasticizer were kneaded together according to the formulas shown in Table 4 for 15 minutes to give rubber compositions. These rubber compositions were respectively press-molded at 170° C. to manufacture sheets. From these sheets, specimens measuring 6 mm L×5 mm W×2 mm T were cut out.

Using each specimen, the storage modulus G' and loss tangent δ were measured with the dynamic viscoelasticity meter DVA-200 (IT Metric Control). The measuring frequency was 0.5 Hz.

The hot-melt properties of the above specimens were visually evaluated at the temperatures indicated in Table 4. The evaluation criteria used were: ○=sufficiently flowable on heating, □=moderately flowable, X=not flowable at all.

The results are shown in Table 4.

TABLE 4

| | | Example | | | | | | | | | | Compar. Ex. |
|---|---|---|---|---|---|---|---|---|---|---|---|---|
| | | 10 | 11 | 12 | 13 | 14 | 15 | 16 | 17 | 18 | 19 | 8 |
| Formulation, parts by weight | Block copolymer (A) | | | | | | | | | | | |
| | SIB-2 | 80 | — | 80 | — | — | — | — | — | — | — | — |
| | SIB-3 | — | 80 | — | 80 | 80 | 80 | — | — | — | — | — |
| | SIB-4 | — | — | — | — | — | — | 80 | 80 | 80 | 80 | — |
| | Thermoplastic elastomer: | | | | | | | | | | | |
| | SIBS-2 | — | — | — | — | — | — | — | — | — | — | 100 |
| | SEPS | 20 | 20 | 20 | 20 | 20 | 20 | 20 | 10 | 20 | 20 | — |
| | Thermoplastic resin: | | | | | | | | | | | |
| | EOC | — | — | — | — | 20 | — | — | — | 20 | — | — |
| | HDPE | — | — | — | — | — | 20 | — | — | — | 20 | — |
| | Tackifying resin: | | | | | | | | | | | |
| | P-70 | 40 | 40 | 10 | 10 | 50 | 50 | 40 | 10 | 50 | 50 | — |
| | P-100 | — | — | — | — | — | — | — | — | — | — | 25 |
| | Plasticizer: PW-380 | 40 | 40 | 10 | 10 | 40 | 40 | 40 | 10 | 40 | 40 | — |
| Performance Evaluation | Storage modulus ratio (G'$_{10° C.}$/G'$_{30° C.}$) | 2.4 | 1.8 | 2.7 | 2.1 | 1.9 | 2.0 | 1.9 | 2.4 | 2.0 | 2.2 | 1.6 |
| | Loss tangent | | | | | | | | | | | |
| | (10° C.) | 0.64 | 0.42 | 0.90 | 0.51 | 0.51 | 0.53 | 0.45 | 0.70 | 0.56 | 0.58 | 0.59 |
| | (20° C.) | 0.71 | 0.48 | 0.90 | 0.59 | 0.53 | 0.55 | 0.50 | 0.74 | 0.58 | 0.59 | 0.41 |
| | (30° C.) | 0.70 | 0.56 | 0.76 | 0.67 | 0.58 | 0.61 | 0.56 | 0.75 | 0.60 | 0.62 | 0.31 |
| | Hot-melt properties | | | | | | | | | | | |
| | (170° C.) | ○ | ○ | ○ | Δ | ○ | ○ | X | X | X | X | X |
| | (200° C.) | ○ | ○ | ○ | Δ | ○ | ○ | X | X | X | X | X |
| | (220° C.) | ○ | ○ | ○ | ○ | ○ | ○ | X | X | X | X | X |

The particulars of the thermoplastic elastomer, thermoplastic resin, tackifying resin and plasticizer mentioned in Table 4 are as follows.

Thermoplastic elastomer: SEPS (styrene-ethylene/propylene-styrene triblock copolymer (SEPTON 2007, product of Kuraray)

Thermoplastic resin: EOC (ethylene-octene copolymer (ENGAGE 8150, product of Dow)

Thermoplastic resin: HDPE (high-density polyethylene, HIZEX 2200J, product of Mitsui Chemical)

Tackifying resin: P-70 (ARCON P-70, product of Arakawa Chemical)

Tackifying resin: P-100 (ARCON P-100, product of Arakawa Chemical)

Plasticizer: PW-380 (paraffinic process oil PW-380, product of Idemitsu Kosan)

Examples 10 to 19 were invariably satisfactory in the balance between damping capacity and temperature-dependence of rigidity at and around room temperature. Particularly in comparison with Examples 16 and 17, Examples 10 to 13 showed selective improvements in hot-melt properties substantially without being affected in dynamic characteristics, i.e. the balance between tan $\delta$ and temperature-dependence of G'. Moreover, in Examples 14 and 15 where in EOC or HDPE was formulated, hot-melt properties were selectively improved substantially without compromise in dynamic characteristics, namely the balance between tan $\delta$ and the temperature dependence of G'.

EXAMPLE 20

Damper material compositions were produced according to the formulas indicated in Table 5 in otherwise the same manner as in Examples 10 to 19. From each composition thus obtained, a 12 g aliquot was weighed out and sandwiched between 50 mm×100 mm×7 mm general-purpose structural rolled steel [SS400 (JISG-3101)] sheets sandblasted for surface treatment in advance. The assembly was heated in an oven at 190° C. to cause the composition to flow, whereby a small-sized viscoelastic damper of the shape illustrated in FIG. 1 was obtained. The composition became sufficiently flowable at 190° C. and was found to show sufficient adhesion to steel sheets without leaving air cells, thus having satisfactory hot-melt processability.

TABLE 5

|  | Ex. 20 |
| --- | --- |
| Formulation, parts by weight | |
| Block copolymer (A): | |
| SIB-2 | — |
| SIB-3 | 80 |
| SIB-4 | — |
| Thermoplastic elastomer: | |
| SIBS-2 | — |
| SEPS 10 | 10 |
| Thermoplastic resin: | |
| EOC | 20 |
| HDPE | — |
| Tackifying resin: | |
| P-70 | 50 |
| P-100 | — |
| Plasticizer: PW-380 | 40 |

TABLE 5-continued

|  | Ex. 20 |
| --- | --- |
| Performance evaluation | |
| Storage modulus ratio | 2.2 |
| ($G'_{10° C.}/G'_{30° C.}$) | |
| Loss tangent | |
| (10 ° C.) | 0.55 |
| (20 ° C.) | 0.63 |
| (30 ° C.) | 0.76 |
| Hot-melt properties | |
| (170° C.) | ◯ |
| (200° C.) | ◯ |
| (220° C.) | ◯ |

Figure 3:
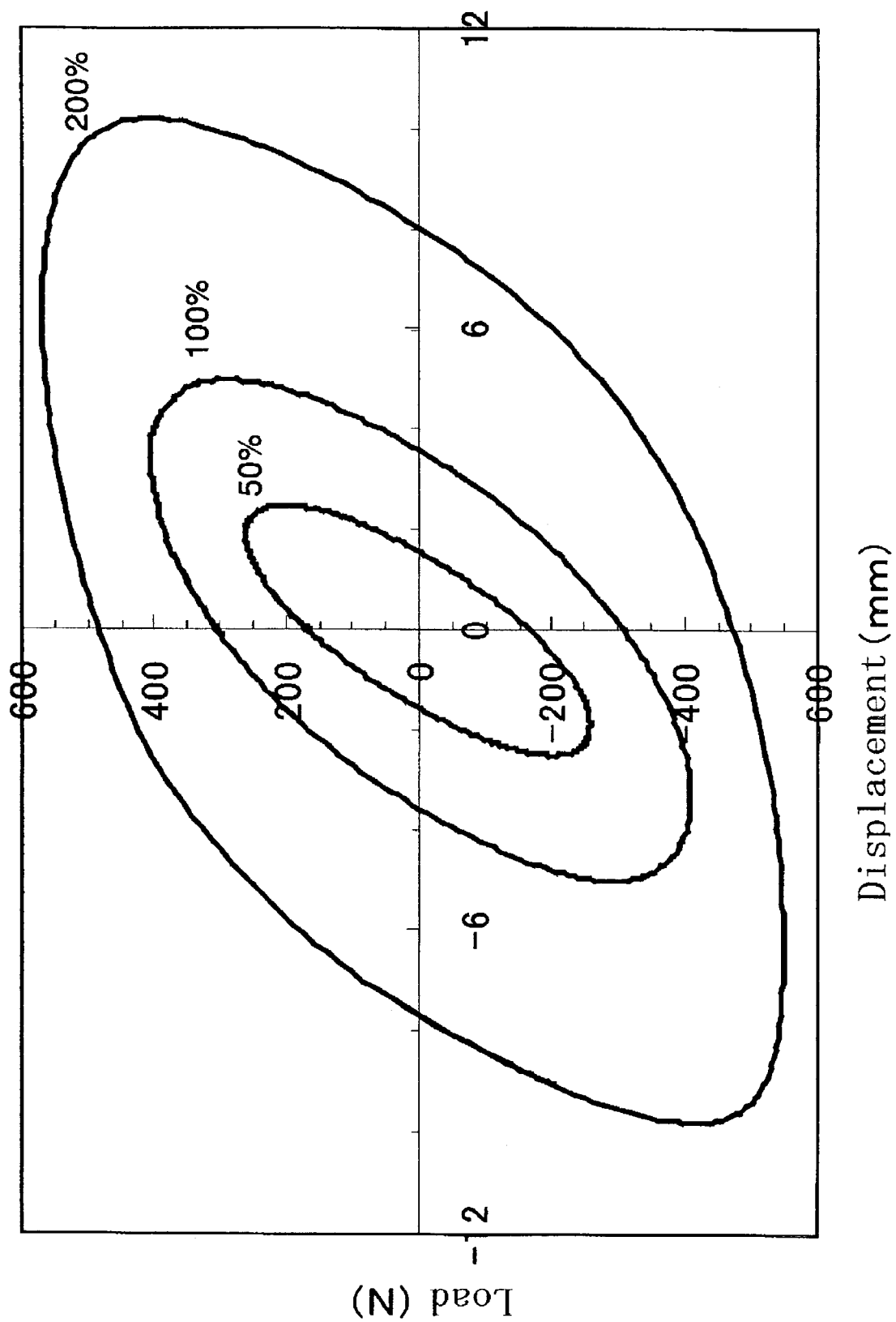
FIG. 3 shows hysteresis loops showing the load-displacement relationship representing the damping performance of the viscoelastic damper fabricated in Example 20.

The viscoelastic damper obtained was set with a jig on a vibrating machine and a dynamic vibration test was carried out. MTS's 831 Elastomer Test System was used as the testing instrument and an incubator was used for temperature control. The measuring conditions were: frequency 0.5 Hz, strain 50%, 100% or 200%; temperature 0° C., 10° C., 20° C., 30° C. or 40° C. The equivalent rigidity (Keq) and equivalent damping factor (heq) values calculated from the hysteresis loops are shown in Table 6. The hysteresis loops at 20° C. are shown in FIG. 3.

TABLE 6

|  |  | Strain | | |
| --- | --- | --- | --- | --- |
|  |  | 50% | 100% | 200% |
| Keq (0° C.) | MPa | 0.161 | 0.121 | 0.075 |
| Keq (10° C.) | MPa | 0.121 | 0.085 | 0.053 |
| Keq (20° C.) | MPa | 0.081 | 0.057 | 0.037 |
| Keq (30° C.) | MPa | 0.062 | 0.045 | 0.032 |
| Keq (40° C.) | Mpa | 0.041 | 0.032 | 0.026 |
| Keq (10° C.)/Keq (30° C.) | — | 2.0 | 1.9 | 1.7 |
| Keq (0° C.)/Keq (40° C.) | — | 3.9 | 3.8 | 2.9 |
| heq (0° C.) | — | 0.35 | 0.45 | 0.61 |
| heq (10° C.) | — | 0.36 | 0.47 | 0.63 |
| heq (20° C.) | — | 0.41 | 0.53 | 0.64 |
| heq (30° C.) | — | 0.46 | 0.56 | 0.61 |
| heq (40° C.) | — | 0.48 | 0.55 | 0.56 |

It will be apparent from Table 6 that, in the actual measurement of damper performance, the viscoelastic damper fabricated using the damper material composition of this invention is low in the temperature dependence of rigidity and shows a high damping capacity at and around room temperature. It can also seen in FIG. 3 that the viscoelastic damper fabricated using the damper material composition of this invention shows a concentric expansion of its hysteresis loop according to an increasing strain, thus being an excellent architectural viscoelastic damper with a small strain dependence (high linearity). Moreover, no delamination from steel sheets was observed even under a large strain of 200%, indicating that the composition shows sufficient adhesion.

EXAMPLE 21

Using the damper material composition produced in Example 20, a double-sided self-adhesive tape was fabricated by means of a single-screw extruder. The screw temperature was set at 90° C. and the die temperature was set at 110° C. The thickness and width of the tape were controlled at 1 mm and 50 mm, respectively.

The adhesion of the product tape was evaluated by a shear test. The tape was cut to 25 mm×25 mm and secured to one edge of a sandblasted 25 mm×100 mm×5 mm general-purpose structural steel sheet [SS400 (JIS G-3101)]. Then, another steel sheet was secured to the tape to prepare a specimen for the shear test. Using Autograph AG-10TB (Shimadzu Corporation), the specimen was pulled in the shear direction at a speed of 300 mm/min and the maximum strain causing detachment or destruction of the tape was measured. As a result, the maximum strain was found to be 2280%. The destruction was a cohesive failure and no interfacial failure took place. The above findings indicate that the damper material composition according to the present invention enables the provision of a double-sided self-adhesive tape having sufficient adhesion and capable of functioning as a double-sided self-adhesive tape having vibration-damping properties.

INDUSTRIAL APPLICABILITY

The damper material composition of the present invention not only features an improvement in the attenuation of damping capacity at 20 to 40° C. and a consequent good balance between damping capacity and temperature dependence of rigidity at and around room temperature, which are conflicting characteristic parameters, but also self-adhesive properties and good deformability, thus enabling the provision of excellent architectural viscoelastic dampers.

Furthermore, the damper material composition of the invention has excellent hot-melt processability in addition to the good balance between damping capacity and temperature dependence of rigidity at and around room temperature, thus enabling the provision of an architectural damper and a vibration-damping double-sided self-adhesive tape, both of which have excellent hot-melt processability.

The invention claimed is:

1. A damper material composition which comprises:
a block copolymer (A) comprising a polymer block (a) and polymer block (b) and terminating in said polymer block (b);
wherein said polymer block (a) is comprised of an aromatic vinyl compound as a constituent monomer and said polymer block (b) is comprised of isobutylene as a constituent monomer; and
wherein the ratio of the storage modulus (G') value at 0° C. to the corresponding value at 40° C. as found by the measurement of dynamic viscoelasticity at a frequency of 0.5 Hz and a shear strain of 0.05% in the shear mode, namely ($G'_{0°\,C.}/G'_{40°\,C.}$), is not greater than 10, and the loss tangent (tan δ) value as found by said measurement is not smaller than 0.4 at 0° C. to 40° C.; and
wherein the aromatic vinyl compound is at least one selected from the group consisting of styrene, o-, m- or p-methylstyrene, β-methylstyrene, 2,6-dimethylstyrene, 2,4-dimethylstyrene, α-methyl-o-methylstyrene, α-methyl-m-methylstyrene, α-methyl-p-methylstyrene, β-methyl-o-methylstyrene, β-methyl-m-methylstyrene, β-methyl-p-methylstyrene, 2, 4, 6-trimethylstyrene, α-methyl-2, 6-dimethylstyrene, α-methyl-2, 4-dimethylstyrene, β-methyl-2, 6-dimethylstyrene, β-methyl-2, 4-dimethylstyrene, o-, m- or p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2, 6-dichlorostyrene, α-chloro-2, 4-dichlorostyrene, β-chloro-2,6-dichlorostyrene, β-chloro-2, 4-dichlorostyrene, o-, m- or p-t-butylstyrene, o-, m- or p-methoxystyrene, o-, m- or p-chloromethylstyrene, o-, m- or p-bromomethylstyrene, silyl-substituted styrene derivatives, indene and vinylnaphthalene.

2. The damper material composition according to claim 1 wherein the block copolymer (A) is a diblock copolymer having a polymer block (a)—polymer block (b) structure.

3. The damper material composition according claim 2 wherein the polymer block (a) has a number average molecular weight of not more than 10,000.

4. The damper material composition according to any of claims 1, 2 or 3
containing at least one kind of a tackifying resin and a plasticizer.

5. The damper material composition according to claim 1 containing at least one kind of thermoplastic resin (C).

6. A damper material composition which comprises:
a block copolymer (A) comprising a polymer block (a) and a polymer block (b) and terminating in said polymer block (b), and a thermoplastic resin (C);
wherein said polymer block (a) is comprised of an aromatic vinyl compound as a constituent monomer and said polymer block (b) is comprised of isobutylene as a constituent monomer;
wherein the ratio of the storage modulus (G') value at 0° C. to the corresponding value at 40° C. as found by the measurement of dynamic viscoelasticity at a frequency of 0.5 Hz and a shear strain of 0.05% in the shear mode, namely($G'_{0°\,C.}/G'_{40°\,C.}$), is not greater than 10, and the loss tangent (tan δ) value as found by said measurement is not smaller than 0.4 at 0° C. to 40° C.; and
wherein the thermoplastic resin (C) is at least one selected from the group consisting of ethylene-propylene copolymer, ethylene-butene copolymer, ethylene-hexene copolymer, ethylene-octene copolymer, ethylene-vinyl acetate copolymer, ethylene-ethyl acrylate copolymer, high-density polyethylene, low-density polyethylene, linear low-density polyethylene and isobutylene-isoprene copolymer (butyl rubber).

7. The damper material composition according to claim 1 containing at least one kind of thermoplastic elastomer (D).

8. The damper material composition according to claim 7 wherein the thermoplastic elastomer (D) is at least one selected from the group consisting of a triblock copolymer having the structure of (a polymer block comprised of an aromatic vinyl compound as a constituent monomer)—(a polymer block comprising a conjugated diene as a constituent monomer and optionally hydrogenated)—(a polymer block comprised of an aromatic vinyl compound as a constituent monomer) and a triblock copolymer having the structure of (a polymer block comprised of an aromatic vinyl compound as a constituent monomer)—(a polymer block comprised of isobutylene as a constituent monomer)—(a polymer block comprised of an aromatic vinyl compound as a constituent monomer).

9. A damper material composition comprising:
a diblock copolymer (A') comprising a polymer block (a') and a polymer block (b);
said polymer block (a') being comprised of an aromatic vinyl compound as a constituent monomer and having a number average molecular weight of not more than 10,000; and said polymer block (b) being comprised of isobutylene as a constituent monomer;

wherein the ratio of the storage modulus (G') value at 10° C. to the corresponding value at 30° C. as found by the measurement of dynamic viscoelasticity at a frequency of 0.5 Hz and a shear strain of 0.05% in the shear mode, namely ($G'_{10° C.}/G'_{30° C.}$), is not greater than 2, and the loss tangent (tan δ) value as found by said measurement is not smaller than 0.4 at 10° C. to 30° C.; and wherein the aromatic vinyl compound is at least one selected from the group consisting of styrene, o-, m- or p-methylstyrene, β-methylstyrene, 2,6-dimethylstyrene, 2,4-dimethylstyrene, α-methyl-o-methylstyrene, α-methyl-m-methylstyrene, α-methyl-p-methylstyrene, β-methyl-o-methylstyrene, β-methyl-m-methylstyrene, β-methyl-p-methylstyrene, 2, 4, 6-trimethylstyrene, α-methyl-2, 6-dimethylstyrene, α-methyl-2, 4-dimethylstyrene, β-methyl-2, 6-dimethylstyrene, β-methyl-2, 4-dimethylstyrene, o-, m- or p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2, 6-dichlorostyrene, α-chloro-2, 4-dichlorostyrene, β-chloro-2,6-dichlorostyrene, β-chloro-2, 4-dichlorostyrene, o-, m- or p-t-butylstyrene, o-, m- or p-methoxystyrene, o-, m- or p-chloromethylstyrene, o-, m- or p-bromomethylstyrene, silyl-substituted styrene derivatives, indene and vinylnaphthalene.

10. The damper material composition according to claim 9 containing at least one kind of thermoplastic elastomer (D).

11. The damper material composition according to claim 10 wherein the thermoplastic elastomer (D) is a triblock copolymer having the structure of (a polymer block comprised of an aromatic vinyl compound as a constituent monomer)—(a polymer block comprised of a conjugated diene as a constituent monomer and optionally hydrogenated)—(a polymer block comprised of an aromatic vinyl compound as a constituent monomer).

12. A damper material composition comprising:
a diblock copolymer (A') comprising a polymer block (a') and a polymer block (b), and a thermoplastic resin (C);
said polymer block (a') being comprised of an aromatic vinyl compound as a constituent monomer and having a number average molecular weight of not more than 10,000; and said polymer block (b) being comprised of isobutylene as a constituent monomer;

wherein in said damper material the ratio of the storage modulus (G') value at 10° C. to the corresponding value at 30° C. as found by the measurement of dynamic viscoelasticity at a frequency of 0.5 Hz and a shear strain of 0.05% in the shear mode, namely ($G'_{10° C.}/G'_{30° C.}$), is not greater than 2, and the loss tangent (tan δ) value as found by said measurement is not smaller than 0.4 at 10° C. to 30° C.; and wherein the thermoplastic resin (C) is at least one selected from the group consisting of ethylene-propylene copolymer, ethylene-butene copolymer, ethylene-hexene copolymer, ethylene-octene copolymer, ethylene-vinyl acetate copolymer, ethylene-ethyl acrylate copolymer, high-density polyethylene, low-density polyethylene, linear low-density polyethylene and isobutylene-isoprene copolymer (butyl rubber).

13. The damper material composition according to claim 9 containing at least one kind of a tackifying resin and a plasticizer.

14. The vibration damper having the structure of a combination of the damper material composition according to claim 1, 6, 9 or 12 with steel sheet or steel pipe.

15. A damping double-sided self-adhesive tape comprising the damper material composition according to claim 1, 6, 9 or 13 as molded in the form of a tape.

16. The damper material composition according to claim 1 or 9, wherein the aromatic vinyl compound is at least one selected from the group consisting of styrene, p-methylstyrene, p-chlorostyrene, p-t-butylstyrene, p-methoxystyrene, p-chloromethylstyrene, p-bromomethylstyrene, silyl-substituted styrene derivatives and indene.

17. The damper material composition according to claim 16, wherein the aromatic vinyl compound is at least one selected from the group consisting of styrene, p-methylstyrene and indene.

18. The damper material composition according to claim 17, wherein the aromatic vinyl compound is styrene.

19. The damper material composition according to claim 10, containing at least one kind of thermoplastic resin (C).

* * * * *

UNITED STATES PATENT AND TRADEMARK OFFICE
CERTIFICATE OF CORRECTION

| | | |
|---|---|---|
| PATENT NO. | : 7,241,837 B2 | Page 1 of 1 |
| APPLICATION NO. | : 10/240903 | |
| DATED | : July 10, 2007 | |
| INVENTOR(S) | : Shigeru Yaguchi et al. | |

It is certified that error appears in the above-identified patent and that said Letters Patent is hereby corrected as shown below:

<u>In the Claims</u>

Column 32, in claim 15, line 3, before "as molded in" delete "13" and substitute --12-- in its place.

Signed and Sealed this

Twentieth Day of November, 2007

JON W. DUDAS
*Director of the United States Patent and Trademark Office*